US012382482B2

(12) United States Patent
Bai et al.

(10) Patent No.: US 12,382,482 B2
(45) Date of Patent: Aug. 5, 2025

(54) TRANSMISSION CONFIGURATION INDICATOR STATE MODE SWITCHING

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 17/718,229

(22) Filed: Apr. 11, 2022

(65) Prior Publication Data

US 2022/0386327 A1    Dec. 1, 2022

Related U.S. Application Data

(60) Provisional application No. 63/195,526, filed on Jun. 1, 2021.

(51) Int. Cl.
*H04W 72/50* (2023.01)
*H04W 52/14* (2009.01)

(52) U.S. Cl.
CPC ......... *H04W 72/535* (2023.01); *H04W 52/14* (2013.01)

(58) Field of Classification Search
CPC . H04W 52/14; H04W 52/262; H04W 52/242; H04W 52/146; H04W 52/42; H04W 52/325; H04W 52/08; H04W 52/0216; H04W 72/535; H04W 72/21; H04W 52/18; H04W 52/06; H04W 52/38
See application file for complete search history.

(56) References Cited

U.S. PATENT DOCUMENTS

| 2022/0330251 A1* | 10/2022 | Xu | H04W 72/23 |
| 2023/0239096 A1* | 7/2023 | Go | H04L 5/0098 |
| | | | 370/329 |
| 2024/0064649 A1* | 2/2024 | Go | H04L 5/0094 |

OTHER PUBLICATIONS

International Search Report and Written Opinion—PCT/US2022/024469—ISA/EPO—Sep. 26, 2022.

(Continued)

*Primary Examiner* — Ricardo H Castaneyra
(74) *Attorney, Agent, or Firm* — Holland & Hart LLP

(57) ABSTRACT

Methods, systems, and devices for wireless communications are described. A user equipment (UE) may identify a transmission configuration indicator (TCI) state to use for communications with a network entity after switching between TCI modes (e.g., a joint TCI state mode and a separate TCI states mode for uplink transmission and downlink reception). A UE may autonomously switch between the TCI modes based on a trigger event, and may send an indication to a network entity of the trigger event prior to communicating. A UE may identify a TCI configuration with unconfigured power control parameters. The UE may determine a common power control configuration for communicating with a network entity based on applying a rule to the TCI configuration to determine the power control parameters.

30 Claims, 22 Drawing Sheets

(56) References Cited

OTHER PUBLICATIONS

Mediatek Inc: "Enhancement on Multi-Beam Operation", 3GPP TSG RAN WG1 #104-e, R1-2100588, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021, XP051971059, 27 Pages.

Samsung: "Multi-Beam Enhancements", 3GPP TSG RAN WG1 #104-e, R1-2101186, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051971402, 24 Pages, Section 2.3, Section 2.2, Section 4, Section 4.3, Proposal 10, Sections 1-7, Appendix 1, pp. 6-7, section 3 Issue 2: Inter-cell mobility enhancements.

Futurewei: "Enhancement On Multi-Beam Operation", 3GPP TSG RAN WG1 Meeting #105-e, R1-2104205, 3GPP, Mobile Competence Centre, 650, Route Des Lucioles, F-06921 Sophia-Antipolis Cedex, France, vol. RAN WG1, No. e-Meeting, 20210519-2021052, May 11, 2021, XP052006076, 11 Pages, URL:https://ftp.3gpp.org/tsg_ran/WG1_RL1/TSGR1_105-e/Docs/R1-2104205.zip R1-2104205.docx.

Moderator, (Samsung): "Moderator Summary for Multi-Beam Enhancement", R1-2105290, 3GPP, Mobile Competence Centre, 650, Route Des Lucioles, F-06921 Sophia-Antipolis Cedex, France, vol. RAN WG1, No. e-Meeting, May 10-27, 2021, May 20, 2021, XP052012814, URL:https://ftp.3gpp.org/tsg_ran/WG1_RL1/TSGR1_105-e/Inbox/R1-2105290.zip R1-2105290 femimo item 1 round 0-v06_qc_apple, Draft R1-2105290, 67 Pages.

Partial International Search Report and Written Opinion—PCT/US2022/024469—ISA/EPO—Jul. 19, 2022.

Sony: "Further Enhancement on Multi-Beam Operation", 3GPP TSG RAN WG1#105e, R1-2105151, 3GPP, Mobile Competence Centre, 650, Route Des Lucioles, F-06921 Sophia-Antipolis Cedex, France, vol. RAN WG1, No. E-meeting, May 10, 2021-May 27, 2021, May 12, 2021, XP052011230, 19 Pages, URL:https://ftp.3gpp.org/tsg_ran/WG1_RL1/TSGR1_105-e/Docs/R1-2105151.zip R1-2105151.docx.

* cited by examiner

|  Capability Information 330 |  Feedback Message 345 |

Trigger Event Report 340

TRANSMISSION CONFIGURATION INDICATOR STATE MODE SWITCHING

CROSS REFERENCE

The present application for patent claims the benefit of U.S. Provisional Patent Application No. 63/195,526 by BAI et al., entitled "TRANSMISSION CONFIGURATION INDICATOR STATE MODE SWITCHING," filed Jun. 1, 2021, assigned to the assignee hereof, and expressly incorporated by reference herein.

FIELD OF TECHNOLOGY

The following relates to wireless communications, including transmission configuration indicator (TCI) state mode switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support transmission configuration indicator (TCI) state mode switching. Generally, the described techniques provide for a user equipment (UE) to identify a transmission configuration indicator (TCI) state to use for communications with a base station after switching between TCI modes (e.g., a joint TCI state mode and a separate TCI states mode for uplink transmission and downlink reception). A UE may autonomously switch between the TCI modes based on a trigger event, and may send an indication to a base station of the trigger event prior to communicating. A UE may identify a TCI configuration with unconfigured power control parameters. The UE may determine a common power control configuration for communicating with a base station based on applying a rule to the TCI configuration to determine the power control parameters.

A method for wireless communications at a UE is described. The method may include receiving signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception, identifying, based on a configuration for determining a TCI state to use after switching between the first TCI mode and the second TCI mode, the TCI state based on switching between the first TCI mode and the second TCI mode, and communicating with a network entity using the TCI state based on the identifying.

An apparatus for wireless communications at a UE is described. The apparatus may include a processor, memory coupled with the processor, and instructions stored in the memory. The instructions may be executable by the processor to cause the apparatus to receive signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception, identify, based on a configuration for determining a TCI state to use after switching between the first TCI mode and the second TCI mode, the TCI state based on switching between the first TCI mode and the second TCI mode, and communicate with a network entity using the TCI state based on the identifying.

Another apparatus for wireless communications at a UE is described. The apparatus may include means for receiving signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception, means for identifying, based on a configuration for determining a TCI state to use after switching between the first TCI mode and the second TCI mode, the TCI state based on switching between the first TCI mode and the second TCI mode, and means for communicating with a network entity using the TCI state based on the identifying.

A non-transitory computer-readable medium storing code for wireless communications at a UE is described. The code may include instructions executable by a processor to receive signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception, identify, based on a configuration for determining a TCI state to use after switching between the first TCI mode and the second TCI mode, the TCI state based on switching between the first TCI mode and the second TCI mode, and communicate with a network entity using the TCI state based on the identifying.

In some examples of the method, apparatuses, and non-transitory computer-readable medium described herein, identifying the TCI state may include operations, features, means, or instructions for receiving an indication of the TCI state in the signaling.

In some examples of the method, apparatuses, and non-transitory computer-readable medium described herein, identifying the TCI state may include operations, features, means, or instructions for identifying a rule corresponding to the TCI state, where the rule defines the TCI state based on an initial TCI state from before switching between the first TCI mode and the second TCI mode.

Some examples of the method, apparatuses, and non-transitory computer-readable medium described herein may further include operations, features, means, or instructions for determining to switch between the first TCI mode or the second TCI mode and a third TCI mode simultaneous to switching between the first TCI mode and the second TCI mode, where the third TCI mode supports at least one of the joint TCI state and the separate TCI states.

Some examples of the method, apparatuses, and non-transitory computer-readable medium described herein may further include operations, features, means, or instructions for receiving an indication of a downlink TCI state, an uplink TCI state, or both associated with the third TCI mode.

Some examples of the method, apparatuses, and non-transitory computer-readable medium described herein may further include operations, features, means, or instructions for transmitting a message including capability information corresponding to a capability of the UE to support one or more of the first TCI mode or the second TCI mode.

In some examples of the method, apparatuses, and non-transitory computer-readable medium described herein, the signaling includes downlink control information (DCI), a medium access control-control element (MAC-CE), or radio resource control (RRC) signaling.

A method for wireless communications at a UE is described. The method may include identifying a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception, transmitting uplink signaling based on the trigger event, and switching between the first TCI mode and the second TCI mode for communicating based on transmitting the uplink signaling.

An apparatus for wireless communications at a UE is described. The apparatus may include a processor, memory coupled with the processor, and instructions stored in the memory. The instructions may be executable by the processor to cause the apparatus to identify a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception, transmit uplink signaling based on the trigger event, and switch between the first TCI mode and the second TCI mode for communicating based on transmitting the uplink signaling.

Another apparatus for wireless communications at a UE is described. The apparatus may include means for identifying a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception, means for transmitting uplink signaling based on the trigger event, and means for switching between the first TCI mode and the second TCI mode for communicating based on transmitting the uplink signaling.

A non-transitory computer-readable medium storing code for wireless communications at a UE is described. The code may include instructions executable by a processor to identify a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception, transmit uplink signaling based on the trigger event, and switch between the first TCI mode and the second TCI mode for communicating based on transmitting the uplink signaling.

In some examples of the method, apparatuses, and non-transitory computer-readable medium described herein, transmitting the uplink signaling may include operations, features, means, or instructions for transmitting a report based on determining a maximum permissible exposure (MPE) may be exceeded at the UE, detecting a beam failure, or both, where the trigger event includes the determination.

Some examples of the method, apparatuses, and non-transitory computer-readable medium described herein may further include operations, features, means, or instructions for receiving a feedback message corresponding to the uplink signaling after switching between the first TCI mode and the second TCI mode, where the switching may be performed based on a timing threshold associated with the uplink signaling being satisfied.

Some examples of the method, apparatuses, and non-transitory computer-readable medium described herein may further include operations, features, means, or instructions for receiving a feedback message corresponding to the uplink signaling before switching between the first TCI mode and the second TCI mode, where the switching may be based on the received feedback message and a timing threshold associated with the feedback message being satisfied.

Some examples of the method, apparatuses, and non-transitory computer-readable medium described herein may further include operations, features, means, or instructions for transmitting a message including capability information corresponding to a capability of the UE to support one or more of the first TCI mode or the second TCI mode.

In some examples of the method, apparatuses, and non-transitory computer-readable medium described herein, the uplink signaling includes an indication of an uplink beam for the communicating.

A method for wireless communications at a UE is described. The method may include identifying a TCI configuration having unconfigured power control parameters associated with a TCI mode, the TCI mode supporting at least one of a joint TCI state for an uplink transmission and a downlink reception and separate TCI states for the uplink transmission and the downlink reception, applying a rule to determine a common power control configuration based on the identifying, where the rule is applied to the TCI configuration to determine one or more power control parameters of the unconfigured power control parameters, and communicating based on the common power control configuration.

An apparatus for wireless communications at a UE is described. The apparatus may include a processor, memory coupled with the processor, and instructions stored in the memory. The instructions may be executable by the processor to cause the apparatus to identify a TCI configuration having unconfigured power control parameters associated with a TCI mode, the TCI mode supporting at least one of a joint TCI state for an uplink transmission and a downlink reception and separate TCI states for the uplink transmission and the downlink reception, applying a rule to determine a common power control configuration based on the identifying, where the rule is applied to the TCI configuration to determine one or more power control parameters of the unconfigured power control parameters, and communicate based on the common power control configuration.

Another apparatus for wireless communications at a UE is described. The apparatus may include means for identifying a TCI configuration having unconfigured power control parameters associated with a TCI mode, the TCI mode supporting at least one of a joint TCI state for an uplink transmission and a downlink reception and separate TCI states for the uplink transmission and the downlink reception, means for applying a rule to determine a common power control configuration based on the identifying, where the rule is applied to the TCI configuration to determine one or more power control parameters of the unconfigured power control parameters, and means for communicating based on the common power control configuration.

A non-transitory computer-readable medium storing code for wireless communications at a UE is described. The code may include instructions executable by a processor to identify a TCI configuration having unconfigured power control parameters associated with a TCI mode, the TCI mode supporting at least one of a joint TCI state for an uplink transmission and a downlink reception and separate TCI states for the uplink transmission and the downlink reception, applying a rule to determine a common power control configuration based on the identifying, where the rule is applied to the TCI configuration to determine one or more power control parameters of the unconfigured power control parameters, and communicate based on the common power control configuration.

Some examples of the method, apparatuses, and non-transitory computer-readable medium described herein may further include operations, features, means, or instructions for determining one or more TCI states corresponding to a channel or a reference signal based on applying the common power control configuration to the one or more TCI states according to the rule.

In some examples of the method, apparatuses, and non-transitory computer-readable medium described herein, the rule specifies the common power control configuration includes a single power control configuration.

Some examples of the method, apparatuses, and non-transitory computer-readable medium described herein may further include operations, features, means, or instructions for determining a single power control configuration corresponding to the common power control configuration and applying the common power control configuration to a set of TCI states having the unconfigured power control parameters.

Some examples of the method, apparatuses, and non-transitory computer-readable medium described herein may further include operations, features, means, or instructions for transmitting a message including capability information corresponding to a capability of the UE to support the TCI mode.

Some examples of the method, apparatuses, and non-transitory computer-readable medium described herein may further include operations, features, means, or instructions for determining a capability of the UE to support beam misalignment.

Some examples of the method, apparatuses, and non-transitory computer-readable medium described herein may further include operations, features, means, or instructions for transmitting a message including capability information corresponding to the capability of the UE to support the beam misalignment.

Some examples of the method, apparatuses, and non-transitory computer-readable medium described herein may further include operations, features, means, or instructions for determining a quasi-colocation relationship between a downlink reference signal and at least one power control parameter of the one or more power control parameters based on the capability of the UE to support the beam misalignment, where the beam misalignment may be between the downlink reference signal and the at least one power control parameter, and where the communicating may be based on determining the quasi-colocation relationship.

Some examples of the method, apparatuses, and non-transitory computer-readable medium described herein may further include operations, features, means, or instructions for receiving signaling activating the TCI mode.

In some examples of the method, apparatuses, and non-transitory computer-readable medium described herein, the TCI configuration having the unconfigured power control parameters includes a power control configuration that may be not associated with a TCI state identifier.

In some examples of the method, apparatuses, and non-transitory computer-readable medium described herein, the one or more power control parameters include a base station received power per resource block, a fractional power control factor, closed loop index (CLI), a pathloss reference signal, or any combination thereof.

A method for wireless communications at a base station is described. The method may include transmitting, to a UE signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception, identifying, based on a configuration for determining a TCI state to use after switching between the first TCI mode and the second TCI mode, the TCI state based on switching between the first TCI mode and the second TCI mode, and communicating with the UE using the TCI state based on the identifying.

An apparatus for wireless communications at a base station is described. The apparatus may include a processor, memory coupled with the processor, and instructions stored in the memory. The instructions may be executable by the processor to cause the apparatus to transmit, to a UE signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception, identify, based on a configuration for determining a TCI state to use after switching between the first TCI mode and the second TCI mode, the TCI state based on switching between the first TCI mode and the second TCI mode, and communicate with the UE using the TCI state based on the identifying.

Another apparatus for wireless communications at a base station is described. The apparatus may include means for transmitting, to a UE signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception, means for identifying, based on a configuration for determining a TCI state to use after switching between the first TCI mode and the second TCI mode, the TCI state based on switching between the first TCI mode and the second TCI mode, and means for communicating with the UE using the TCI state based on the identifying.

A non-transitory computer-readable medium storing code for wireless communications at a base station is described. The code may include instructions executable by a processor to transmit, to a UE signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception, identify, based on a configuration for determining a TCI state to use after switching between the first TCI mode and the second TCI mode, the TCI state based on switching between the first TCI mode and the second TCI mode, and communicate with the UE using the TCI state based on the identifying.

In some examples of the method, apparatuses, and non-transitory computer-readable medium described herein, identifying the TCI state may include operations, features, means, or instructions for transmitting an indication of the TCI state in the signaling.

In some examples of the method, apparatuses, and non-transitory computer-readable medium described herein, identifying the TCI state may include operations, features, means, or instructions for identifying a rule corresponding to the TCI state, where the rule defines the TCI state based on an initial TCI state from before switching between the first TCI mode and the second TCI mode.

Some examples of the method, apparatuses, and non-transitory computer-readable medium described herein may further include operations, features, means, or instructions for determining to switch between the first TCI mode or the second TCI mode and a third TCI mode simultaneous to switching between the first TCI mode and the second TCI mode, where the third TCI mode supports at least one of the joint TCI state and the separate TCI states.

Some examples of the method, apparatuses, and non-transitory computer-readable medium described herein may further include operations, features, means, or instructions for receiving an indication of a downlink TCI state, an uplink TCI state, or both associated with the third TCI mode.

Some examples of the method, apparatuses, and non-transitory computer-readable medium described herein may further include operations, features, means, or instructions for transmitting a message including capability information corresponding to a capability of the UE to support one or more of the first TCI mode or the second TCI mode.

In some examples of the method, apparatuses, and non-transitory computer-readable medium described herein, the signaling includes DCI, a MAC-CE, or RRC signaling.

A method for wireless communications at a base station is described. The method may include receiving, from a UE, uplink signaling based on a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception and switching between the first TCI mode and the second TCI mode for communicating based on receiving the uplink signaling.

An apparatus for wireless communications at a base station is described. The apparatus may include a processor, memory coupled with the processor, and instructions stored in the memory. The instructions may be executable by the processor to cause the apparatus to receive, from a UE, uplink signaling based on a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception and switch between the first TCI mode and the second TCI mode for communicating based on receiving the uplink signaling.

Another apparatus for wireless communications at a base station is described. The apparatus may include means for receiving, from a UE, uplink signaling based on a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception and means for switching between the first TCI mode and the second TCI mode for communicating based on receiving the uplink signaling.

A non-transitory computer-readable medium storing code for wireless communications at a base station is described. The code may include instructions executable by a processor to receive, from a UE, uplink signaling based on a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception and switch between the first TCI mode and the second TCI mode for communicating based on receiving the uplink signaling.

In some examples of the method, apparatuses, and non-transitory computer-readable medium described herein, receiving the uplink signaling may include operations, features, means, or instructions for receiving a report based on determining an MPE may be exceeded at the UE, detecting a beam failure, or both, where the trigger event includes the determination.

Some examples of the method, apparatuses, and non-transitory computer-readable medium described herein may further include operations, features, means, or instructions for transmitting, to the UE, a feedback message corresponding to the uplink signaling, where the switching may be performed based on a timing threshold associated with the uplink signaling being satisfied.

Some examples of the method, apparatuses, and non-transitory computer-readable medium described herein may further include operations, features, means, or instructions for transmitting, to the UE, a feedback message corresponding to the uplink signaling, where the switching may be based on transmitting the feedback message and a timing threshold associated with the feedback message being satisfied.

Some examples of the method, apparatuses, and non-transitory computer-readable medium described herein may further include operations, features, means, or instructions for receiving a message including capability information corresponding to a capability of the UE to support one or more of the first TCI mode or the second TCI mode.

In some examples of the method, apparatuses, and non-transitory computer-readable medium described herein, the uplink signaling includes an indication of an uplink beam for the communicating.

DETAILED DESCRIPTION

Figure 1:
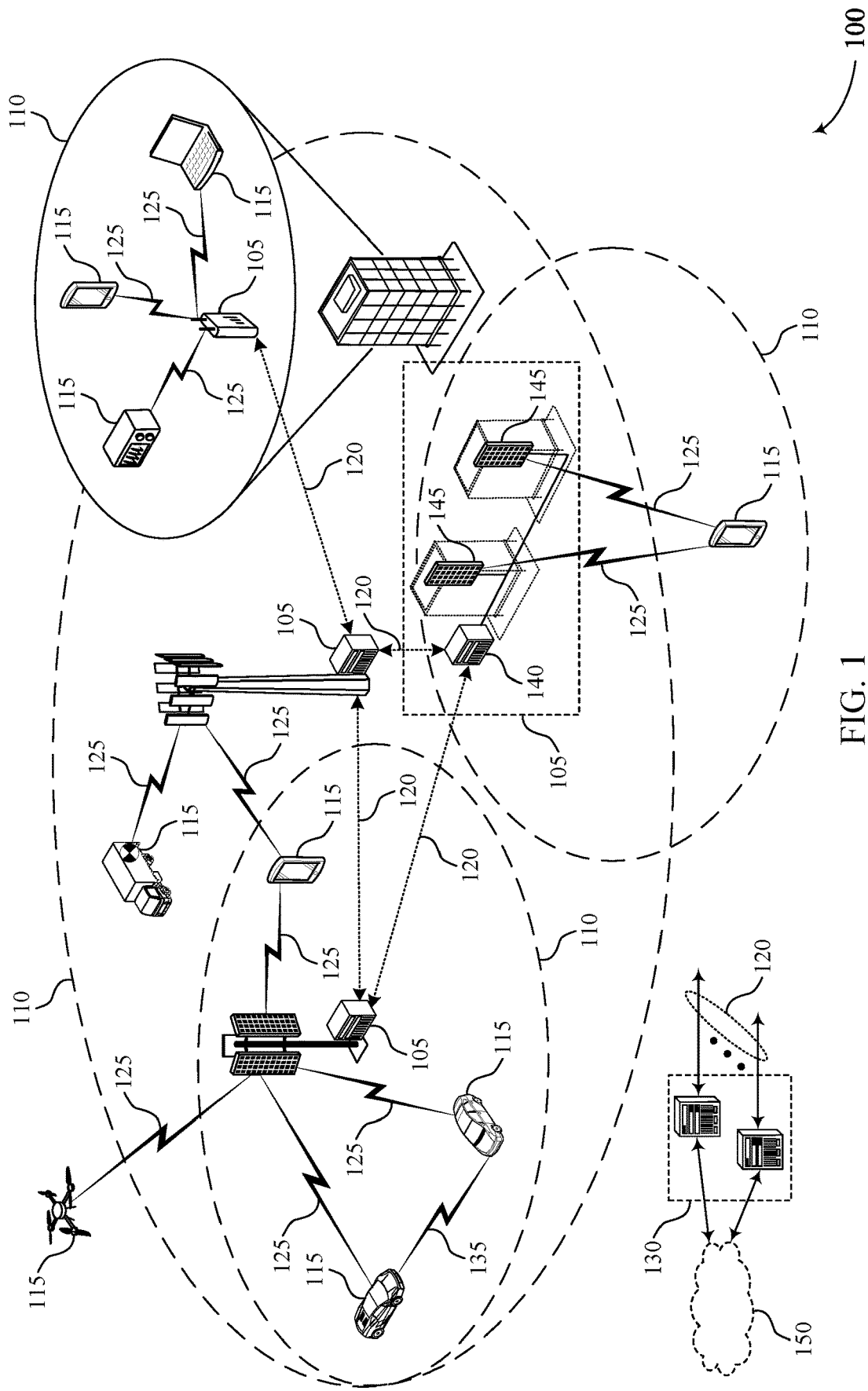
FIGS. 1 through 3 illustrate examples of a wireless communications systems that support transmission configuration indicator (TCI) state mode switching in accordance with aspects of the present disclosure.

In some wireless communications systems, a user equipment (UE) may use transmission configuration indicator (TCI) states for identifying a beam to use for beamforming a transmission in a beamform direction. In some examples, a base station may configure the UE to use a joint TCI state mode (e.g., a single TCI state indicating an uplink beam and downlink beam) or a separate TCI states mode (e.g., different TCI states for an uplink beam and downlink beam, such as to account for maximum permissible exposure (MPE)). For example, the base station may use radio resource control (RRC) signaling, a medium access control-control element (MAC-CE), or a downlink control information (DCI) message to activate one or more of the TCI modes at the UE. Additionally or alternatively, a base station may configure one or more power control or pathloss parameters for a TCI state. In some cases, the UE may receive a TCI state indication including the mode, but the UE may not know which beam to use prior to activating the beam for the mode. In some other cases, the UE may identify an MPE is surpassed or may identify beam failure, but may be unable to switch TCI state modes. In some examples, a TCI state may not be configured for a power control configuration, thus the UE may not know which power control configuration to apply to one or more TCI states for communications.

In some examples, a UE may use a defined mode when switching between TCI modes, such as between a joint TCI state mode and a separate TCI states mode. A base station may signal the defined mode to the UE, or the UE may use a predefined or configured mode (e.g., an initial TCI mode). In some examples, the base station may simultaneously activate both TCI modes at a UE. The UE may use a joint TCI state initially and may subsequently switch to separate TCI states (e.g., signaled separately or together). In some cases, a UE may detect a trigger event, such as an MPE being surpassed or a beam failure, and may transmit an uplink transmission including a report. The report may trigger a TCI mode switch at the UE (e.g., from a joint TCI state to separate TCI states to reduce signaling overhead and latency). The UE may apply the new TCI state a time after sending the report or after receiving a feedback message for the report. In some examples, if a TCI state does not have an association with one or more power control parameters (e.g., a base station received power per resource block, a fractional power control factor, closed loop index (CLI), a pathloss reference signal, or any combination thereof), the UE may apply a common power control configuration to TCI states per channel or reference signal. The UE may transmit capability signaling to the base station related to using a joint TCI state or separate TCI states.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to TCI state mode switching.

FIG. 1 illustrates an example of a wireless communications system 100 that supports TCI state mode switching in accordance with aspects of the present disclosure. The wireless communications system 100 may include one or more network entities such as base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. In various examples, a base station 105 may be an example of a network entity, and a network entity may be referred to as a network element, a mobility element, a radio access network (RAN) node, or network equipment, among other nomenclature. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may use TCI states for identifying a beam to use for beamforming a transmission in a beamform direction. In some examples, a base station 105 may configure the UE 115 to use a joint TCI state mode or a separate TCI states mode. Additionally or alternatively, a base station 105, or a network entity, may configure one or more power control or pathloss parameters for a TCI state. In some cases, the UE 115 may receive a TCI state indication including the mode, but the UE 115 may not know which beam to use prior to activating the beam for the mode. In some other cases, the UE 115 may identify an MPE is surpassed or may identify beam failure, but may be unable to switch TCI state modes. In some examples, a TCI state may not be configured for a power control configuration, thus the UE 115 may not know which power control configuration to apply to one or more TCI states for communications.

In some examples, a UE 115 may use a defined TCI state when switching between TCI modes, such as between a joint TCI state mode and a separate TCI states mode. In some cases, a UE 115 may detect a trigger event, such as an MPE being surpassed or a beam failure, and may transmit an uplink transmission including a report. The report may trigger a TCI mode switch at the UE 115. The UE 115 may apply the new TCI state a time after sending the report or after receiving a feedback message for the report. In some examples, if a TCI state does not have an association with one or more power control parameters, a pathloss reference signal, or both, the UE 115 may apply a common power control configuration, pathloss reference signal configuration, or both to TCI states per channel or reference signal.

Figure 2:
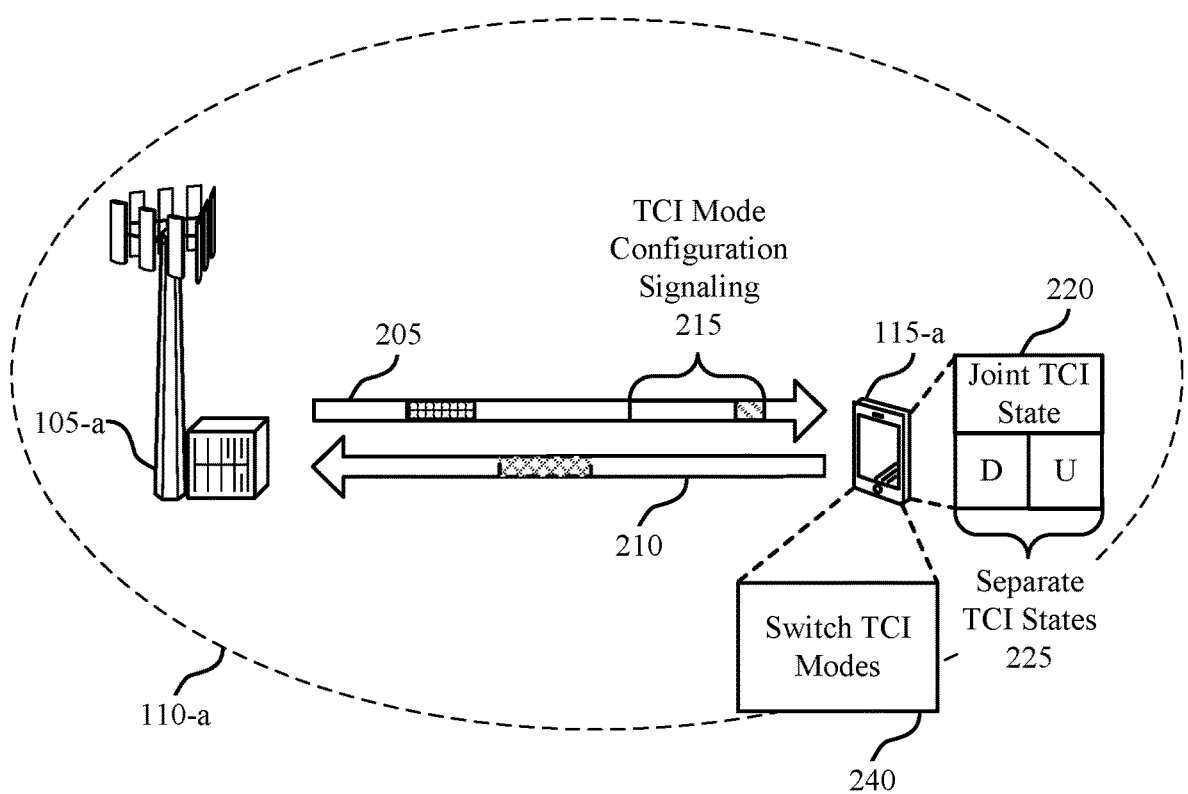

FIG. 2 illustrates an example of a wireless communications system 200 that supports TCI state mode switching in accordance with aspects of the present disclosure. In some examples, wireless communications system 200 may implement aspects of wireless communications system 100 and may include a UE 115-a and a base station 105-a with a coverage area 110-a, which may be examples of a UE 115 and a base station 105 with a coverage area 110 as described with reference to FIG. 1. In some cases, the base station 105-a may be an example of a network entity. In some examples, base station 105-a and UE 115-a may communicate control information, data, or both using a downlink communication link 205 and an uplink communication link 210. For example, base station 105-a may transmit TCI mode configuration signaling 215 to UE 115-a via a downlink communication link 205.

In some examples, wireless communication devices (e.g., base stations 105 and UEs 115) may communicate via directional transmissions, in which beamforming may be applied using one or more antenna elements to form a beam in a particular direction. For example, UE 115-a may use a downlink beam to receive a signal from base station 105-a via downlink communication link 205. Similarly, UE 115-a may use an uplink beam to transmit a signal to base station 105-a via uplink communication link 210. Such wireless communication systems may utilize TCI states to indicate a beam for transmission or reception by a UE 115, a base station 105, or both. A TCI state may indicate a quasi-colocation (QCL) relationship between a downlink reference signal (e.g., a channel state information-reference signal (CSI-RS), aperiodic CSI-RS (AP-CSI-RS), tracking reference signal (TRS), positioning reference signals (PRS), or the like) and an antenna port. For example, base station 105-a may use a TCI state to indicate to UE 115-a a beam (e.g., uplink transmit beam, downlink receive beam) configuration based on a beam configuration of a previously received reference signal.

In some cases, there may be different TCI modes for communication between UE 115-a and base station 105-a. For example, UE 115-a may use a joint TCI state 220 to receive and transmit, such as a same TCI state for an uplink transmit beam and a downlink receive beam. In some other examples, UE 115-a may use separate TCI states 225 to receive and transmit, such as a different TCI state for an uplink (U) transmit beam than for a downlink (D) receive beam. In some examples, base station 105-a may define a unified TCI state including the joint and separate downlink and uplink common TCI states. UE 115-a and base station 105-a may apply the unified TCI state to at least two channels or reference signals. That is, the joint TCI state 220 may be applied to at least one downlink channel or reference signal and one uplink channel or reference signal, while the separate TCI states 225 may be applied to at least two downlink or uplink channels or reference signals.

In some cases, the joint TCI state 220 and the separate TCI states 225 may be applied to multiple channels. The applicable channels may be defined (e.g., configured or pre-configured) by base station 105-a via control signaling, such as in RRC signaling or signaling including the TCI state indication. In some examples, UE 115-a may operate according to the different TCI modes. For example, there may be two TCI modes for communicating with base station 105-a. In a first mode, UE 115-a may use the separate TCI states 225 for uplink and downlink communications with base station 105-a. For example, when UE 115-a identifies MPE issues (e.g., an exceeded MPE in uplink or downlink), UE 115-a may use a different uplink beam than the downlink beam. In a second mode, UE 115-a may use the joint TCI state 220 for uplink and downlink communications with base station 105-a. For example, when UE 115-a identifies channel correspondence between uplink and downlink, uplink and downlink communications may be from a same beam direction.

In some cases, UE 115-a may receive signaling from base station 105-a to indicate which mode to use for a beam indication. For example, base station 105-a may configure two modes of TCI states at UE 115-a, including the first mode and the second mode. Base station 105-a may use control signaling, such as a MAC-CE or a DCI message, to activate or select a mode and corresponding TCI state for UE 115-a to use. Additionally or alternatively, base station 105-a may configure TCI states into separate pools for each mode (e.g., via RRC signaling), then base station 105-a may transmit control signaling, such as a MAC-CE or DCI message, to select a pool to activate.

In some examples, UE 115-a may support the joint TCI state 220, where a TCI state includes at least one source reference signal to provide a reference for determining QCL, spatial filter, or both. Additionally or alternatively, UE 115-a may support separate TCI states 225. For the separate downlink TCI state, one or more source reference signals for the downlink TCI may provide QCL information for UE-dedicated reception on a downlink shared channel (e.g., a physical downlink shared channel (PDSCH)), for UE-dedicated reception on one or more control resource sets (CORESETs) in a component carrier, or both. For the separate uplink TCI state, one or more source reference signals for the uplink TCI may provide a reference for determining common uplink transmit spatial filters for a dynamic-grant or configured-grant based uplink shared channel (e.g., a physical uplink shared channel (PUSCH)), dedicated uplink control channel (e.g., a physical uplink control channel (PUCCH)) resources in a component carrier, or both. In some cases, the uplink transmit spatial filter may apply to sounding reference signal (SRS) resources in one or more resource sets configured for antenna switching, codebook-based uplink transmissions, non-codebook-based uplink transmissions, or a combination thereof.

In some cases, base station 105-a may dynamically indicate for UE 115-a to use either the joint TCI state 220 or the separate TCI states 225. A UE 115 may indicate to a base station 105 a capability to support the joint TCI state 220, the separate TCI states 225, or both. For example, UE 115-a may transmit capability information 230 to base station 105-a via uplink communication link 210. The capability information 230 may include a capability of UE 115-a to support the joint TCI state 220, the separate TCI states 225, or both. Base station 105-a may configure UE 115-a with the joint TCI state 220, the separate TCI states 225, or both via control signaling, such as RRC signaling or a MAC-CE. For example, base station 105-a may configure UE 115-a with the joint TCI state 220, the separate TCI states 225, or both based on the capability information 230. In some cases, a UE 115 may receive a TCI state indication 235 including an indication of a mode to use, but the UE 115 may not know which beam to use prior to activating the beam for the mode.

In some examples, a base station 105 may transmit TCI mode configuration signaling 215 to configure a UE 115 with a mode to use prior to activating a beam during a TCI mode switching operation. For example, at 240, UE 115-a may determine to switch TCI modes (e.g., between joint TCI states 220 and separate TCI states 225). Base station 105-a may transmit TCI mode configuration signaling 215 to UE 115-a to configure UE 115-a with one or more TCI states to use during the TCI mode switching operation. In some examples, such as when UE 115-a is configured to switch between a single mode to another single mode, the TCI mode configuration signaling 215 may include a TCI state indication 235, which may indicate new TCI states for a new TCI mode. In some cases, UE 115-a may activate and apply the new TCI states after an activation time along with the new mode. In some other examples, the TCI mode configuration signaling 215 may not contain new TCI states for each channel. For the channels whose new TCI states are not indicated, UE 115-a may use a default TCI state beam until further indication (e.g., even after the new mode is activated). In some examples, the default beam may be based on a TCI state of a previous mode or other predefined beam in the new mode. For example, the default beam may be based on a TCI state with a lowest identifier in a TCI state pool for the new mode. In some cases, when UE 115-a receives signaling to switch from a joint TCI state 220 to separate TCI states 225, but the signaling may not include the new TCI states for uplink channels, then UE 115-a may use the previous joint TCI state 220 for each uplink channel until receiving an indication otherwise. Similarly, when UE 115-a receives signaling to switch from separate TCI states 225 to a joint TCI state 220, but the signaling may not include the new TCI state, then UE 115-a may use the previous uplink or downlink separate TCI states 225 until receiving an indication otherwise.

In some examples, base station 105-a may simultaneously activate both the joint TCI states 220 and separate TCI states 225 at UE 115-a. Thus, UE 115-a dynamically switch from a joint TCI state 220 to separate TCI states 225. In some cases, when base station 105-a indicates for UE 115-a to initially use a joint TCI state 220 and transmits additional signaling to switch to separate TCI states 225, base station 105-a may indicate a single separate downlink or uplink TCI state. That is, TCI mode configuration signaling 215 may include a TCI state indication 235 that indicates a single TCI state. In some examples, the uplink or downlink beam may be for a previous joint TCI state 220, which may not be shared by a downlink or uplink channel. Additionally or alternatively, UE 115-a may switch the uplink or downlink beam to a defined (e.g., pre-determined) uplink or downlink beam paired to a separate uplink or downlink TCI state. In some cases, the TCI state indication 235 may include a pair of separate downlink and uplink TCI states. If a previous beam indication is applicable to a channel or a reference signal, but a new beam indication is not, then the TCI state of the channel or reference signal may be the previous beam or the defined beam.

In some cases, UE 115-a may select the TCI state modes based on control signaling, such as a MAC-CE or a DCI message, and may dynamically switch modes at 240 (e.g., between joint TCI states 220 and separate TCI states 225 for beam indications). In some examples, one or more applicable channels of a beam indication may be defined at UE 115-a (e.g., pre-configured in RRC signaling), either in a TCI state information element (IE) or another IE linked to the TCI state.

In some examples, UE 115-*a* and base station 105-*b* may exchange communications 245 according to the TCI mode configuration signaling 215. For example, UE 115-*a* may transmit signaling to base station 105-*a*, base station 105-*a* may transmit signaling to UE 115-*a*, or both using one or more TCI states based on the TCI mode configuration signaling 215 (e.g., included in the TCI state indication 235 or determined from the TCI mode configuration signaling 215).

Figure 3:
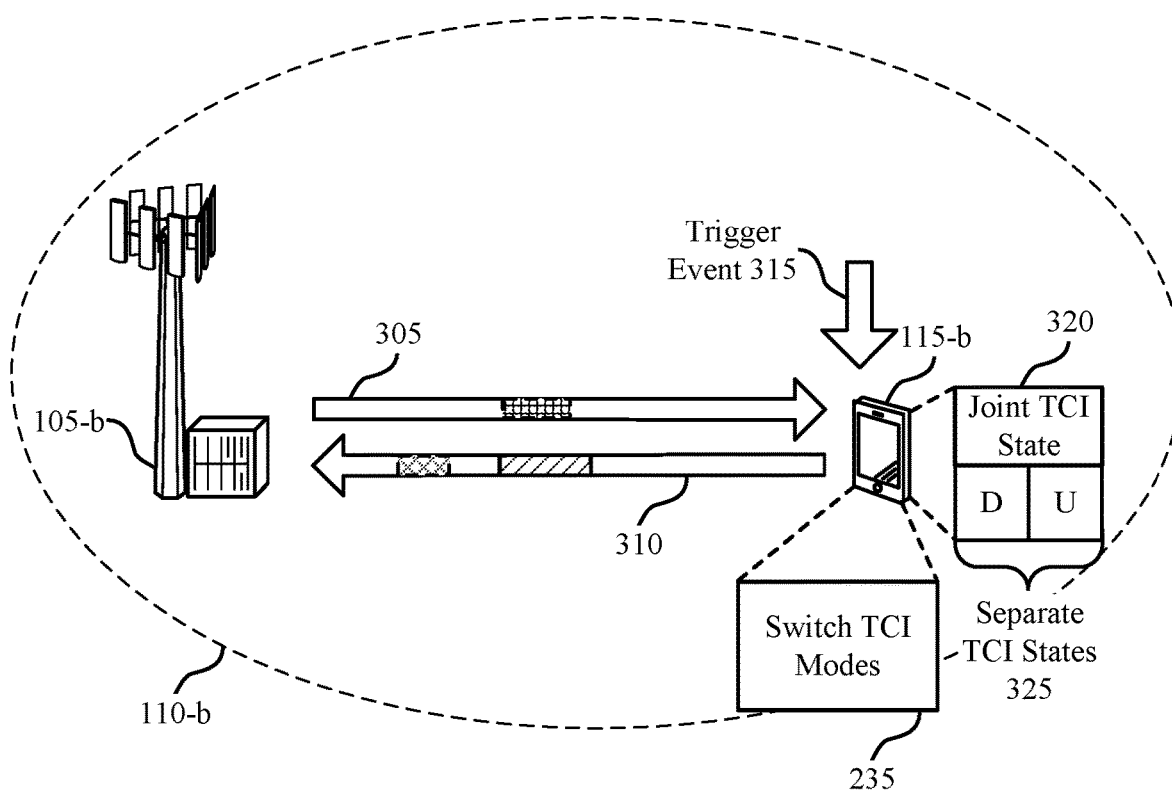
Figure 3:
Figure 3:
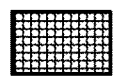
Figure 3:
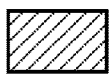

FIG. 3 illustrates an example of a wireless communications system 300 that supports TCI state mode switching in accordance with aspects of the present disclosure. In some examples, wireless communications system 300 may implement aspects of wireless communications system 100 and wireless communications system 200. Wireless communications system 300 may include a UE 115-*b* and a base station 105-*b* with a coverage area 110-*b*, which may be examples of a UE 115 and a base station 105 with a coverage area 110 as described with reference to FIG. 1. In some examples, base station 105-*b* and UE 115-*b* may communicate control information, data, or both using a downlink communication link 305 and an uplink communication link 310, which may be examples of downlink communication links 205 and uplink communication links 210 as described with reference to FIG. 2. For example, UE 115-*b* may identify a trigger event 315 for switching a TCI mode and may transmit a report to base station 105-*b* via uplink communication link 310 based on the trigger event.

In some examples, UE 115-*b* may support a joint TCI state 320 and one or more separate TCI states 325 for an uplink (U) transmit beam and for a downlink (D) receive beam as described with reference to FIG. 2. For example, base station 105-*b* may configure UE 115-*b* with a TCI mode for operating using the joint TCI state 320, the separate TCI states 325, or both. In some examples, a UE 115 may indicate to a base station 105 a capability to support the joint TCI state 320, the separate TCI states 325, or both. For example, UE 115-*b* may transmit capability information 330 to base station 105-*b* via uplink communication link 310. The capability information 330 may include a capability of UE 115-*b* to support the joint TCI state 320, the separate TCI states 325, or both. In some cases, a UE 115 may identify a trigger event 315, such as when an MPE is surpassed or beam failure, but may be unable to switch TCI state modes.

In some examples, UE 115-*b* may identify a trigger event 315 that may trigger UE 115-*b* to switch TCI modes. For example, at 235, UE 115-*b* may identify an MPE is surpassed for an uplink transmission or a downlink reception, beam failure for an uplink beam or a downlink beam, or the like. UE 115-*b* may overcome the MPE issue or the beam failure by switching between a joint TCI state 320 and separate TCI states 325. Thus, at 235, UE 115-*b* may switch TCI modes. For example, UE 115-*b* may detect an MPE, and may switch from a joint TCI state 320 to separate TCI states 325.

In some examples, when UE 115-*b* detect the trigger event 315 and performs a TCI mode switch, UE 115-*b* may transmit uplink signaling to base station 105-*b* indicating the TCI mode switch. That is, when UE 115-*b* detects an MPE is surpassed or a beam failure issue, UE 115-*b* may send trigger event report 340 to base station 105-*b*. In some examples, the trigger event report 340 may include an indication of a replacement beam. The trigger event report 340 may initiate the mode switch at UE 115-*b* (e.g., from a joint TCI state 320 to separate TCI states 325, to reduce signaling overhead and latency). In some examples, the TCI mode switch may be autonomous.

The trigger event report 340 may also initiate an autonomous TCI state switch along with the TCI mode switch at UE 115-*b*. In some examples, such as in the separate TCI state 325 mode, UE 115-*b* may report the uplink beam for the separate uplink beam TCI state in the trigger event report 340. In some cases, the separate downlink beam may be a separate downlink TCI state associated with a previous joint TCI state 320 until otherwise indicated by base station 105-*b*. The downlink TCI state may be based on a source reference signal of separate downlink TCI states that may be the same as or QCLed with a source reference signal of the previous joint TCI state 320.

In some examples, UE 115-*b* may receive a feedback message 345 from base station 105-*b* based on transmitting the trigger event report 340. For example, base station 105-*b* may transmit a positive acknowledgement (ACK) if base station 105-*b* successfully receives the trigger event report 340. In some cases, the activation of a new TCI mode or TCI state at UE 115-*b* may be applied a fixed time after sending the report or receiving the ACK of the report. In some examples, the fixed time may be a number of symbols in time (e.g., 28 symbols). The symbol time may be determined based on a minimum tone spacing among a channel for sending the trigger event report 340, for receiving an ACK, a channel to apply TCI changes, or a combination thereof.

Figure 4:
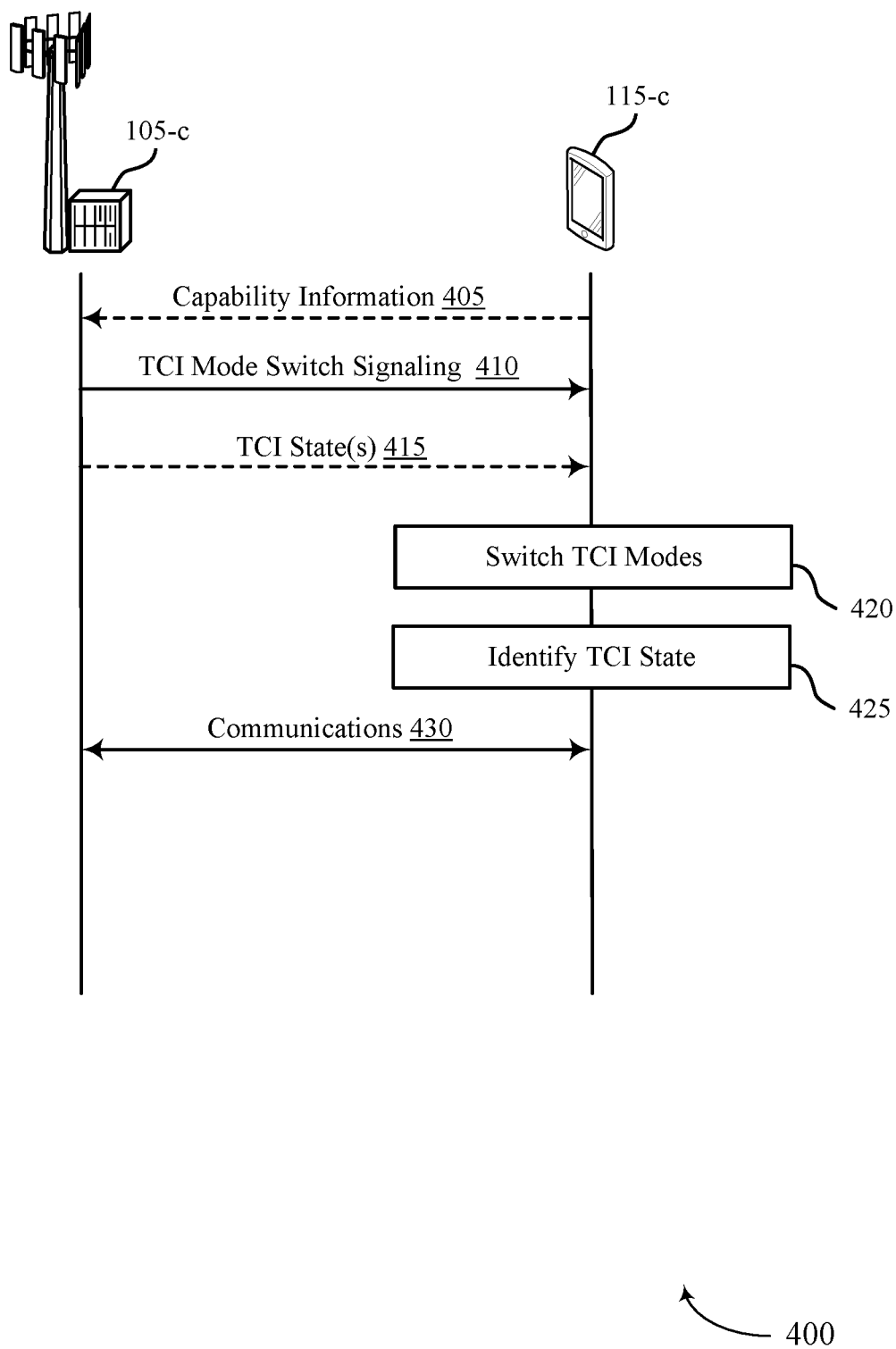
FIGS. 4 through 6 illustrate examples of process flows that support TCI state mode switching in accordance with aspects of the present disclosure.

FIG. 4 illustrates an example of a process flow 400 that supports TCI state mode switching in accordance with aspects of the present disclosure. In some examples, process flow 400 may implement aspects of wireless communications system 100 and wireless communications system 200. The process flow 400 may illustrate an example of a UE 115-*c* identifying a TCI state to use after a TCI mode switching operation for communications with a base station 105-*c*. Alternative examples of the following may be implemented, where some processes are performed in a different order than described or are not performed. In some cases, processes may include additional features not mentioned below, or further processes may be added.

At 405, UE 115-*c* may transmit capability information to base station 105-*c* in an uplink message or signaling. In some examples, the capability information may include a capability of UE 115-*c* to support a TCI mode. For example, UE 115-*c* may support a joint TCI state mode, a separate TCI states mode, or both. In some cases, the capability information may indicate whether UE 115-*c* supports a MAC-CE to activate a joint TCI state mode or a separate TCI states mode. In some other cases, the capability information may indicate whether a MAC-CE activates both the joint TCI state mode and the separate TCI states mode with a DCI message to dynamically switch between the modes (e.g., for a set of defined channels or reference signals).

At 410, base station 105-*c* may transmit TCI mode switch signaling to UE 115-*c*. The TCI mode switch signaling may indicate for UE 115-*c* to switch between a joint TCI state mode and a separate TCI state mode for uplink transmission and downlink reception. Base station 105-*c* may include the TCI mode switch signaling in control signaling, such as RRC signaling, a MAC-CE, a DCI message, or the like.

At 415, UE 115-*c* may receive an indication of one or more TCI states to use after switching TCI modes. Base station 105-*c* may include the TCI states in the TCI mode switch signaling or in additional signaling. For example, the indication may include a downlink TCI state, an uplink TCI state, or both depending on which TCI modes are activated (e.g., a joint TCI state mode, a separate TCI state mode, or both simultaneously).

At 420, UE 115-c may switch TCI modes. For example, UE 115-c may switch from a TCI mode in which UE 115-c uses a joint TCI state for uplink and downlink to a TCI mode in which UE 115-c uses separate TCI states for uplink and downlink, or vice-versa. In some examples, UE 115-c may simultaneously activate both TCI modes (e.g., may determine to switch between TCI modes simultaneously).

At 425, UE 115-c may identify a TCI state based on switching between TCI modes. In some examples, UE 115-c may identify the TCI state based on a configuration for determining a TCI state to use after switching between TCI modes. UE 115-c may identify the TCI state based on a rule defining the TCI state based on an initial or previous TCI state (e.g., from before switching between TCI modes).

At 430, UE 115-c may communicate with a network entity, such as base station 105-c, using the TCI state.

Figure 5:
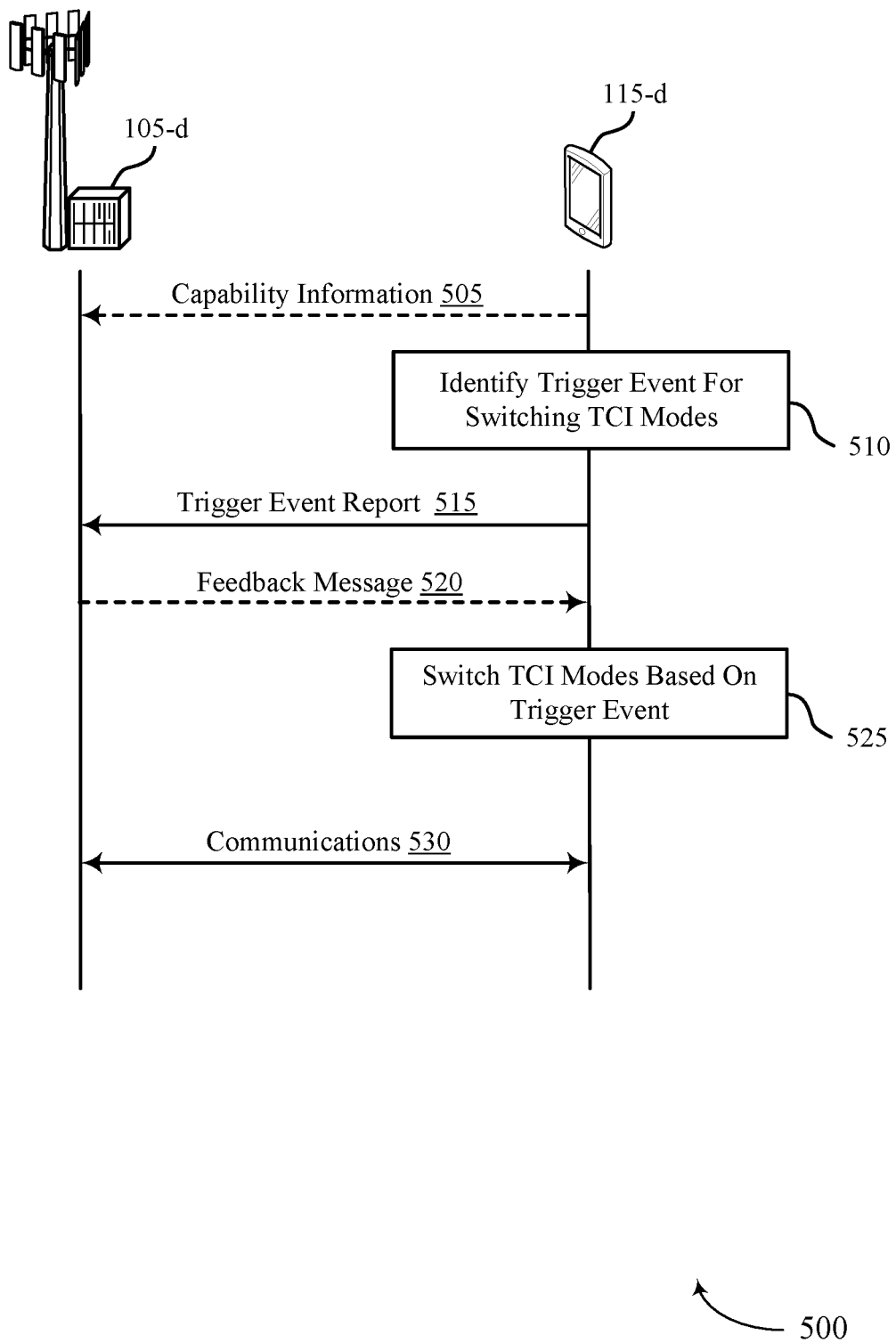

FIG. 5 illustrates an example of a process flow 500 that supports TCI state mode switching in accordance with aspects of the present disclosure. In some examples, process flow 500 may implement aspects of wireless communications system 100 and wireless communications system 300. The process flow 500 may illustrate an example of a UE 115-d autonomously switching TCI modes based on a trigger event and communicating with a base station 105-d according to the TCI mode switch. Alternative examples of the following may be implemented, where some processes are performed in a different order than described or are not performed. In some cases, processes may include additional features not mentioned below, or further processes may be added.

At 505, UE 115-d may transmit capability information to base station 105-d in an uplink message or signaling. In some examples, the capability information may include a capability of UE 115-d to support a TCI mode. For example, UE 115-d may support a joint TCI state mode, a separate TCI states mode, or both. In some cases, the capability information may indicate whether UE 115-d supports a MAC-CE to activate a joint TCI state mode or a separate TCI states mode. In some other cases, the capability information may indicate whether a MAC-CE activates both the joint TCI state mode and the separate TCI states mode with a DCI message to dynamically switch between the modes (e.g., for a set of defined channels or reference signals).

At 510, UE 115-d may identify a trigger event for switching between TCI modes, such as between a joint TCI state mode and a separate TCI state mode for uplink transmission and downlink reception. In some examples, the trigger event may be an exceed MPE at UE 115-d, a beam failure, or both.

At 515, UE 115-d may transmit uplink signaling based on the trigger event to base station 105-d. For example, UE 115-d may transmit a trigger event report to base station 105-d. In some cases, the uplink signaling may include an indication of an uplink beam for communications with base station 105-d.

In some cases, at 520, UE 115-d may receive a feedback message in response to the uplink signaling from base station 105-d. For example, UE 115-d may receive an ACK if base station 105-d successfully receives and decodes the trigger event report.

At 525, UE 115-d may switch TCI modes based on the trigger event and transmitting the uplink signaling. In some cases, UE 115-d may receive the feedback message after switching TCI modes, where UE 115-d switches TCI modes based on a timing threshold for the uplink signaling being satisfied (e.g., a fixed amount of time after the uplink signaling). In some other cases, UE 115-d may switch TCI modes before receiving a feedback message from base station 105-d for the uplink signaling. In some cases, UE 115-d may switch TCI modes based on receiving the feedback message and a timing threshold for the feedback message being satisfied (e.g., a fixed amount of time after receiving the feedback message).

At 530, UE 115-d may communicate with base station 105-d based on switching TCI modes.

Figure 6:
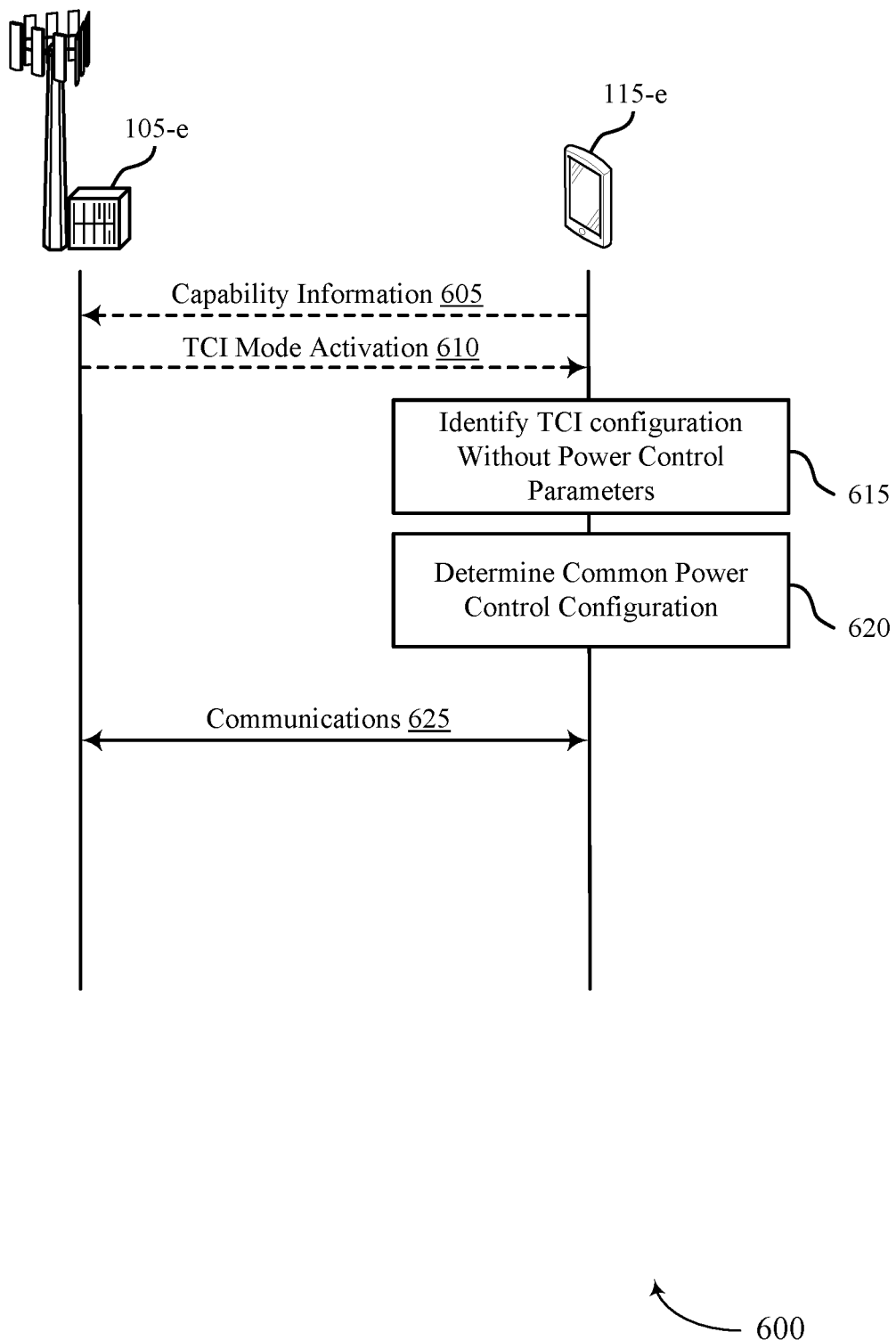

FIG. 6 illustrates an example of a process flow 600 that supports TCI state mode switching in accordance with aspects of the present disclosure. In some examples, process flow 600 may implement aspects of wireless communications system 100, wireless communications system 200, and wireless communications system 300. The process flow 600 may illustrate an example of a UE 115-e determining a common power control configuration for communications with base station 105-e. Alternative examples of the following may be implemented, where some processes are performed in a different order than described or are not performed. In some cases, processes may include additional features not mentioned below, or further processes may be added.

In some examples, a UE 115 may transmit signaling to a base station 105 according to an uplink transmit power. For example, UE 115-e may transmit signaling to base station 105-e according to a calculated uplink transmit power (e.g., a formula for power control for a PUSCH, PUCCH, SRS, or a combination thereof). In some examples, uplink power may be a function of a pathloss estimation and power control parameters. The power control parameters may include a base station received power per resource block ($P_0$), a fractional power control factor ($\alpha$), CLI, a pathloss reference signal, or any combination thereof. In some examples, base station 105-e may configure the power control parameters at UE 115-e. In some examples, UE 115-e may estimate a pathloss based on measuring a received pathloss reference signal (e.g., a synchronization signal block (SSB) or CSI-RS). In some cases, such as for millimeter wave (mmW) communications, different beamforming channels may have different pathloss. Each beamforming channel or beam may be indicated by a TCI state, spatial relationship information, or the like. Each TCI state may have a different pathloss reference signal.

In some cases, UE 115-e may track configured pathloss reference signals and may and estimate pathloss to determine uplink transmit power of a corresponding uplink channel. In some examples, the maximum number of configured pathloss reference signals (e.g., 4 reference signals) may be smaller than a number of uplink TCI states (e.g., up to 64). In some cases, not all TCI states may have dedicated pathloss reference signals of a same beam, thus may have one or more beam alignment issues. In some examples, one or more power control parameters and pathloss reference signals may be configured (e.g., separately) by a base station 105. In some examples, a TCI state may not be configured for a power control configuration, thus the UE may not know which power control configuration to apply to one or more TCI states for communications.

In some examples, UE 115-e may determine a common power control configuration according to a rule to apply to one or more TCI states for communications. In some cases, for each uplink channel or reference signal, including a PUSCH, a PUCCH, and an SRS, the setting of power control parameters (e.g., $P_0$, $\alpha$, CLI, or a combination thereof) may be associated with a separate uplink or joint TCI state. For each channel, base station 105-e may configure multiple settings (e.g., via RRC signaling), and each setting may be associated with at least one TCI state. For example, in an IE that defines a setting, there may be one or more subfields to indicate an applicable channel or reference signal and another subfield to indicate an applicable TCI state.

Power control parameter configurations may be defined in a variable length list. Each element in the list may include a TCI state identifier, which may be optional, $P_0$, $\alpha$, CLI, or a combination thereof. The list may be as long as a number of TCI states. Since power control parameters are channel specific, there may be a list for each channel or reference signal (e.g., one for the PUSCH, one for the PUCCH and one for the SRS). Similarly, UE 115-*e* may be configured with a list of pathloss reference signal configurations. Each pathloss reference signal configuration in the list may include one or more TCI states, resource identifiers (e.g., an SRS resource identifier, a PUCCH resource identifier, or both), or a resource set identifier.

In some examples, the TCI list may not be configured. For example, after performing a TCI mode switch operation, the list may not be configured yet for the new TCI mode. Additionally or alternatively, the TCI states may not be associated with one or more power control parameters in a power control configuration. Similarly, an association with a TCI state or resource may not be configured for a pathloss reference signal configuration. Thus, UE 115-*e* may determine a power control configuration, pathloss reference signal configuration, or both based on a rule.

At 605, UE 115-*e* may transmit capability information to base station 105-*e* in an uplink message or signaling. In some examples, the capability information may include a capability of UE 115-*e* to support a TCI mode. For example, UE 115-*e* may support a joint TCI state mode, a separate TCI states mode, or both. In some cases, the capability information may indicate whether UE 115-*e* supports a MAC-CE to activate a joint TCI state mode or a separate TCI states mode. In some other cases, the capability information may indicate whether a MAC-CE activates both the joint TCI state mode and the separate TCI states mode with a DCI message to dynamically switch between the modes (e.g., for a set of defined channels or reference signals).

Additionally or alternatively, the capability information may include a capability of UE 115-*e* to support beam misalignment. In some cases, UE 115-*e* may be configured with fewer pathloss reference signals than uplink TCI states. An uplink beam may not use the pathloss reference signal from a same direction to measure pathloss, which may result in beam misalignment for a TCI state and uplink TCI states. In some cases, the beam misalignment may be between a downlink reference signal and at least one power control parameter. In some examples, UE 115-*e* may determine a capability to support beam misalignment to provide a spatial relation indication and the pathloss reference signal. For example, the beam misalignment may be between a downlink source reference signal in an uplink or joint TCI state. If UE 115-*e* does not support beam misalignment, then a downlink source reference signal may be the same as a pathloss reference signal, may share a same QCL relationship with a pathloss reference signal, or both. In some cases, UE 115-*e* may support beam misalignment by default, such as for an SRS or for a number of activated uplink beams (e.g., activated uplink and joint TCI states) greater than a threshold. In some examples, the threshold may be a maximum number of configured pathloss reference signals (e.g., 4). In some examples, UE 115-*e* may determine a QCL relationship between the downlink reference signal and the at least one power control parameter based on the capability of UE 115-*e* to support the beam misalignment.

At 610, base station 105-*e* may transmit a TCI mode activation to UE 115-*e* (e.g., via control signaling). For example, base station 105-*e* may transmit signaling activating the TCI mode in a MAC-CE or DCI message to UE 115-*e*.

At 615, UE 115-*e* may identify a TCI configuration without power control parameters. For example, the TCI configuration may include with unconfigured power control parameters may include a power control configuration that may not be associated with a TCI state identifier. The TCI configuration may be associated with or may indicate a TCI mode, such as a joint TCI state mode or a separate TCI state mode for uplink transmission and downlink reception.

At 620, UE 115-*e* may determine a common power control configuration based on identifying and applying a rule to the TCI configuration. UE 115-*e* may determine one or more power control parameters of the unconfigured parameters based on applying the rule. For example, if there is no configured association between the power control parameters and a TCI state, for each channel or reference signal, UE 115-*e* may apply the common control configuration (e.g., with a defined set of power control parameters) per channel or reference signal to each uplink TCI state, joint TCI state, or a combination.

In some examples, UE 115-*e* may determine one or more TCI states of a channel or reference signal based on applying the common power control configuration to the one or more TCI states according to the rule. For example, the rule may specify the common power control configuration includes a single power control configuration. If a TCI state identifier in the power control configuration is not configured, or using a reserved index, a single power control configuration (e.g., the common power control configuration) may be configured at UE 115-*e*. UE 115-*e* may apply the single power control configuration to each TCI state for the channel or reference signal. UE 115-*e* may expect the power control parameters for the single power control configuration for each channel (e.g., no other configured power control parameters). For example, UE 115-*e* may have an initial power control parameter list with an element without a TCI state identifier. Base station 105-*e* may update the list with more elements, where each element has a TCI state association. The initial configuration with a common power control configuration may be defined (e.g., pre-configured) for each TCI mode or in a TCI mode switch configuration.

In some cases, UE 115-*e* may be configured with multiple power control configurations, but a single power control configuration (e.g., a common power control configuration) may be without a TCI state association. UE 115-*e* may use the common power control configuration for each TCI state without associated power control parameters. For example, UE 115-*e* may apply the common power control configuration to a set of TCI states having the unconfigured power control parameters. The other power control configurations with TCI associations may be applied to the associated TCI states. In some examples, base station 105-*e* may choose to use a single parameters for each TCI state. In some cases, if an association with a TCI state or resource is not configured for a pathloss reference signal, a common pathloss reference signal configuration may be applied to each TCI states or each resource in one or more resources sets.

At 625, UE 115-*e* and base station 105-*e* may communicate based on the common power control configuration, the common pathloss reference signal configuration, or both. In some cases, the communicating may be based on determining the QCL relationship based on the capability of UE 115-*e* to support beam misalignment.

Figure 7:
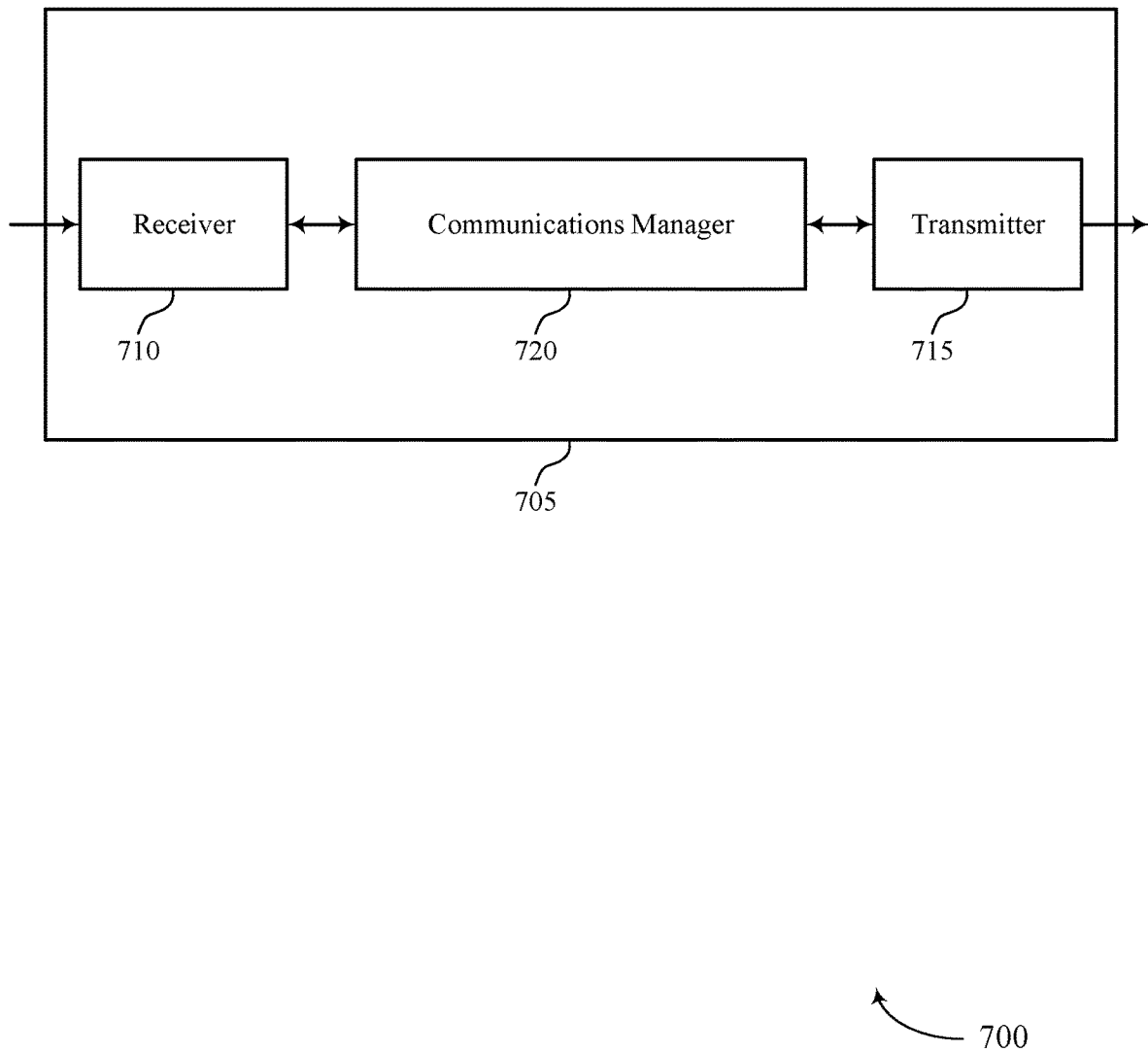
FIGS. 7 and 8 show block diagrams of devices that support TCI state mode switching in accordance with aspects of the present disclosure.

FIG. 7 shows a block diagram 700 of a device 705 that supports TCI state mode switching in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to TCI state mode switching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to TCI state mode switching). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of TCI state mode switching as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The communications manager 720 may be configured as or otherwise support a means for identifying, based on a configuration for determining a TCI state to use after switching between the first TCI mode and the second TCI mode, the TCI state based on switching between the first TCI mode and the second TCI mode. The communications manager 720 may be configured as or otherwise support a means for communicating with a network entity using the TCI state based on the identifying.

Additionally or alternatively, the communications manager 720 may support wireless communications at a UE in accordance with examples as disclosed herein. For example, the communications manager 720 may be configured as or otherwise support a means for identifying a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. The communications manager 720 may be configured as or otherwise support a means for transmitting uplink signaling based on the trigger event. The communications manager 720 may be configured as or otherwise support a means for switching between the first TCI mode and the second TCI mode for communicating based on transmitting the uplink signaling.

Additionally or alternatively, the communications manager 720 may support wireless communications at a UE in accordance with examples as disclosed herein. For example, the communications manager 720 may be configured as or otherwise support a means for identifying a TCI configuration having unconfigured power control parameters associated with a TCI mode, the TCI mode supporting at least one of a joint TCI state for an uplink transmission and a downlink reception and separate TCI states for the uplink transmission and the downlink reception. The communications manager 720 may be configured as or otherwise support a means for determining a common power control configuration based on the identifying and applying a rule to the TCI configuration to determine one or more power control parameters of the unconfigured power control parameters. The communications manager 720 may be configured as or otherwise support a means for communicating based on the common power control configuration.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for a UE to identify a TCI state to use for communications with a base station after switching between TCI modes, autonomously switch between the TCI modes based on a trigger event, and determine a common power control configuration based on applying a rule to a TCI configuration without power control parameters, which may cause reduced processing, reduced power consumption, more efficient utilization of communication resources, and the like.

Figure 8:
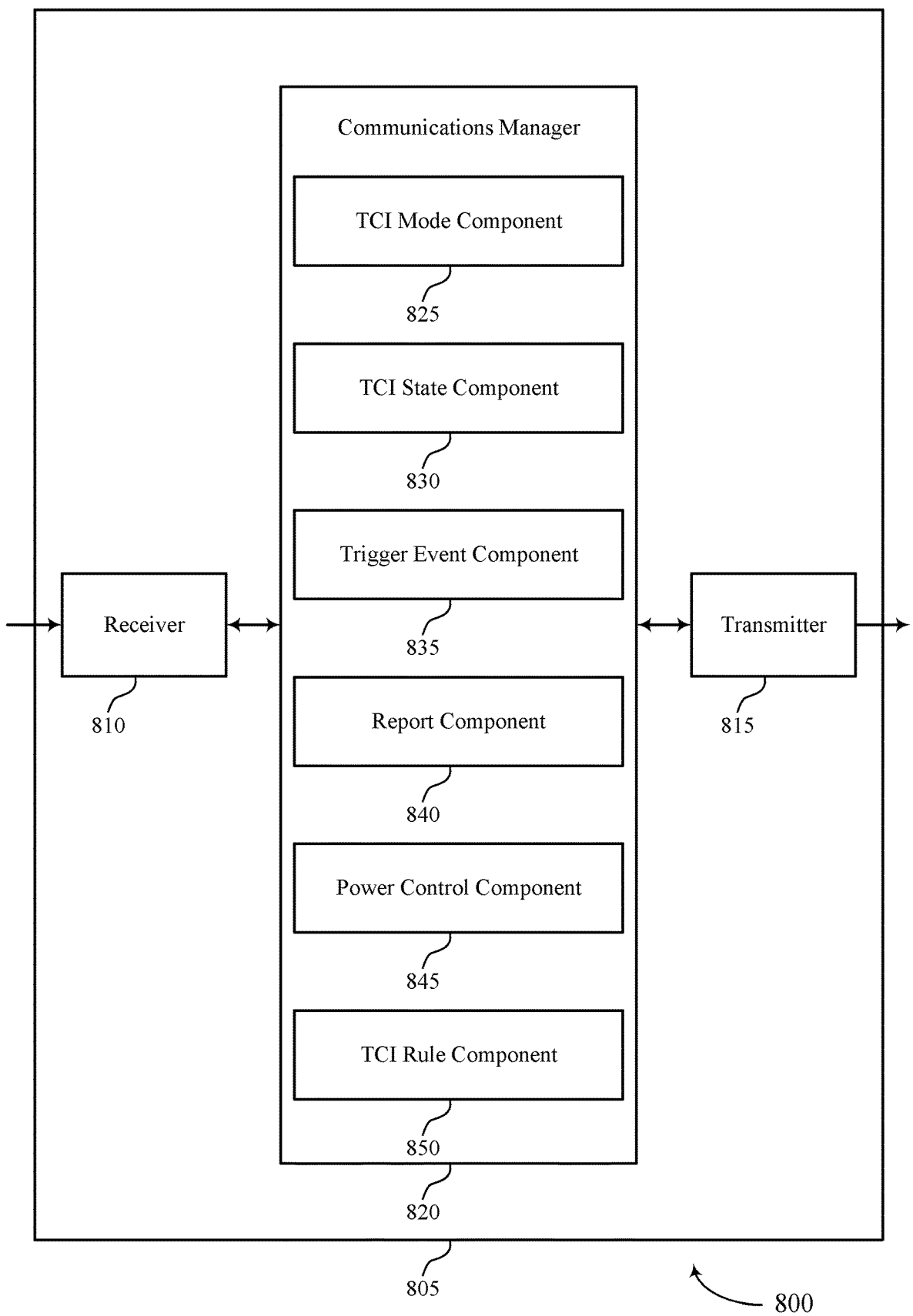

FIG. 8 shows a block diagram 800 of a device 805 that supports TCI state mode switching in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to TCI state mode switching). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to TCI state mode switching). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of TCI state mode switching as described herein. For example, the communications manager 820 may include a TCI mode component 825, a TCI state component 830, a trigger event component 835, a report component 840, a power control component 845, a TCI rule component 850, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The TCI mode component 825 may be configured as or otherwise support a means for receiving signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The TCI state component 830 may be configured as or otherwise support a means for identifying, based on a configuration for determining a TCI state to use after switching between the first TCI mode and the second TCI mode, the TCI state based on switching between the first TCI mode and the second TCI mode. The TCI state component 830 may be configured as or otherwise support a means for communicating with a network entity using the TCI state based on the identifying.

Additionally or alternatively, the communications manager 820 may support wireless communications at a UE in accordance with examples as disclosed herein. The trigger event component 835 may be configured as or otherwise support a means for identifying a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. The report component 840 may be configured as or otherwise support a means for transmitting uplink signaling based on the trigger event. The TCI mode component 825 may be configured as or otherwise support a means for switching between the first TCI mode and the second TCI mode for communicating based on transmitting the uplink signaling.

Additionally or alternatively, the communications manager 820 may support wireless communications at a UE in accordance with examples as disclosed herein. The power control component 845 may be configured as or otherwise support a means for identifying a TCI configuration having unconfigured power control parameters associated with a TCI mode, the TCI mode supporting at least one of a joint TCI state for an uplink transmission and a downlink reception and separate TCI states for the uplink transmission and the downlink reception. The TCI rule component 850 may be configured as or otherwise support a means for determining a common power control configuration based on the identifying and applying a rule to the TCI configuration to determine one or more power control parameters of the unconfigured power control parameters. The power control component 845 may be configured as or otherwise support a means for communicating based on the common power control configuration.

Figure 9:
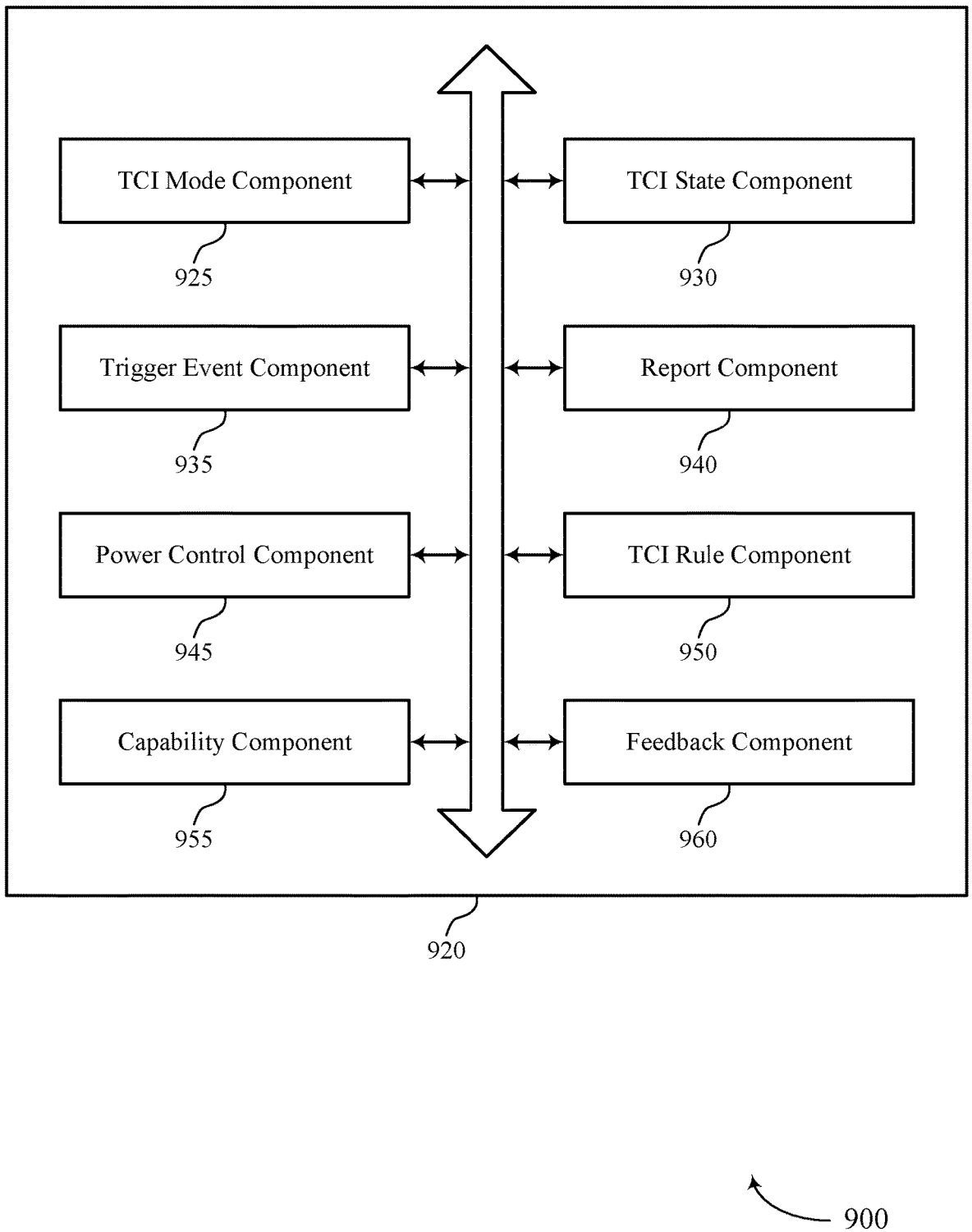
FIG. 9 shows a block diagram of a communications manager that supports TCI state mode switching in accordance with aspects of the present disclosure.

FIG. 9 shows a block diagram 900 of a communications manager 920 that supports TCI state mode switching in accordance with aspects of the present disclosure. The communications manager 920 may be an example of aspects of a communications manager 720, a communications manager 820, or both, as described herein. The communications manager 920, or various components thereof, may be an example of means for performing various aspects of TCI state mode switching as described herein. For example, the communications manager 920 may include a TCI mode component 925, a TCI state component 930, a trigger event component 935, a report component 940, a power control component 945, a TCI rule component 950, a capability component 955, a feedback component 960, or any combination thereof. Each of these components may communicate, directly or indirectly, with one another (e.g., via one or more buses).

The communications manager 920 may support wireless communications at a UE in accordance with examples as disclosed herein. The TCI mode component 925 may be configured as or otherwise support a means for receiving signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The TCI state component 930 may be configured as or otherwise support a means for identifying, based on a configuration for determining a TCI state to use after switching between the first TCI mode and the second TCI mode, the TCI state based on switching between the first TCI mode and the second TCI mode. In some examples, the TCI state component 930 may be configured as or otherwise support a means for communicating with a network entity using the TCI state based on the identifying.

In some examples, to support identifying the TCI state, the TCI state component 930 may be configured as or otherwise support a means for receiving an indication of the TCI state in the signaling.

In some examples, to support identifying the TCI state, the TCI rule component 950 may be configured as or otherwise support a means for identifying a rule corresponding to the TCI state, where the rule defines the TCI state based on an initial TCI state from before switching between the first TCI mode and the second TCI mode.

In some examples, the TCI mode component 925 may be configured as or otherwise support a means for determining to switch between the first TCI mode or the second TCI mode and a third TCI mode simultaneous to switching between the first TCI mode and the second TCI mode, where the third TCI mode supports at least one of the joint TCI state and the separate TCI states.

In some examples, the TCI state component 930 may be configured as or otherwise support a means for receiving an indication of a downlink TCI state, an uplink TCI state, or both associated with the third TCI mode.

In some examples, the capability component 955 may be configured as or otherwise support a means for transmitting a message including capability information corresponding to a capability of the UE to support one or more of the first TCI mode or the second TCI mode.

In some examples, the signaling includes DCI, a MAC-CE, or RRC signaling.

Additionally or alternatively, the communications manager 920 may support wireless communications at a UE in accordance with examples as disclosed herein. The trigger event component 935 may be configured as or otherwise support a means for identifying a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. The report component 940 may be configured as or otherwise support a means for transmitting uplink signaling based on the trigger event. In some examples, the TCI mode component 925 may be configured as or otherwise support a means for switching between the first TCI mode and the second TCI mode for communicating based on transmitting the uplink signaling.

In some examples, to support transmitting the uplink signaling, the report component 940 may be configured as or otherwise support a means for transmitting a report based on determining an MPE is exceeded at the UE, detecting a beam failure, or both, where the trigger event includes the determination.

In some examples, the feedback component 960 may be configured as or otherwise support a means for receiving a feedback message corresponding to the uplink signaling after switching between the first TCI mode and the second TCI mode, where the switching is performed based on a timing threshold associated with the uplink signaling being satisfied.

In some examples, the feedback component 960 may be configured as or otherwise support a means for receiving a feedback message corresponding to the uplink signaling before switching between the first TCI mode and the second TCI mode, where the switching is based on the received feedback message and a timing threshold associated with the feedback message being satisfied.

In some examples, the capability component 955 may be configured as or otherwise support a means for transmitting a message including capability information corresponding to a capability of the UE to support one or more of the first TCI mode or the second TCI mode.

In some examples, the uplink signaling includes an indication of an uplink beam for the communicating.

Additionally or alternatively, the communications manager 920 may support wireless communications at a UE in accordance with examples as disclosed herein. The power control component 945 may be configured as or otherwise support a means for identifying a TCI configuration having unconfigured power control parameters associated with a TCI mode, the TCI mode supporting at least one of a joint TCI state for an uplink transmission and a downlink reception and separate TCI states for the uplink transmission and the downlink reception. The TCI rule component 950 may be configured as or otherwise support a means for determining a common power control configuration based on the identifying and applying a rule to the TCI configuration to determine one or more power control parameters of the unconfigured power control parameters. In some examples, the power control component 945 may be configured as or otherwise support a means for communicating based on the common power control configuration.

In some examples, the TCI state component 930 may be configured as or otherwise support a means for determining one or more TCI states corresponding to a channel or a reference signal based on applying the common power control configuration to the one or more TCI states according to the rule.

In some examples, the rule specifies the common power control configuration includes a single power control configuration.

In some examples, the power control component 945 may be configured as or otherwise support a means for determining a single power control configuration corresponding to the common power control configuration. In some examples, the power control component 945 may be configured as or otherwise support a means for applying the common power control configuration to a set of TCI states having the unconfigured power control parameters.

In some examples, the capability component 955 may be configured as or otherwise support a means for transmitting a message including capability information corresponding to a capability of the UE to support the TCI mode.

In some examples, the capability component 955 may be configured as or otherwise support a means for determining a capability of the UE to support beam misalignment.

In some examples, the capability component 955 may be configured as or otherwise support a means for transmitting a message including capability information corresponding to the capability of the UE to support the beam misalignment.

In some examples, the capability component 955 may be configured as or otherwise support a means for determining a QCL relationship between a downlink reference signal and at least one power control parameter of the one or more power control parameters based on the capability of the UE to support the beam misalignment, where the beam misalignment is between the downlink reference signal and the at least one power control parameter, and where the communicating is based on determining the QCL relationship.

In some examples, the TCI mode component 925 may be configured as or otherwise support a means for receiving signaling activating the TCI mode.

In some examples, the TCI configuration having the unconfigured power control parameters includes a power control configuration that is not associated with a TCI state identifier.

In some examples, the one or more power control parameters include a base station received power per resource block, a fractional power control factor, CLI, a pathloss reference signal, or any combination thereof.

Figure 10:
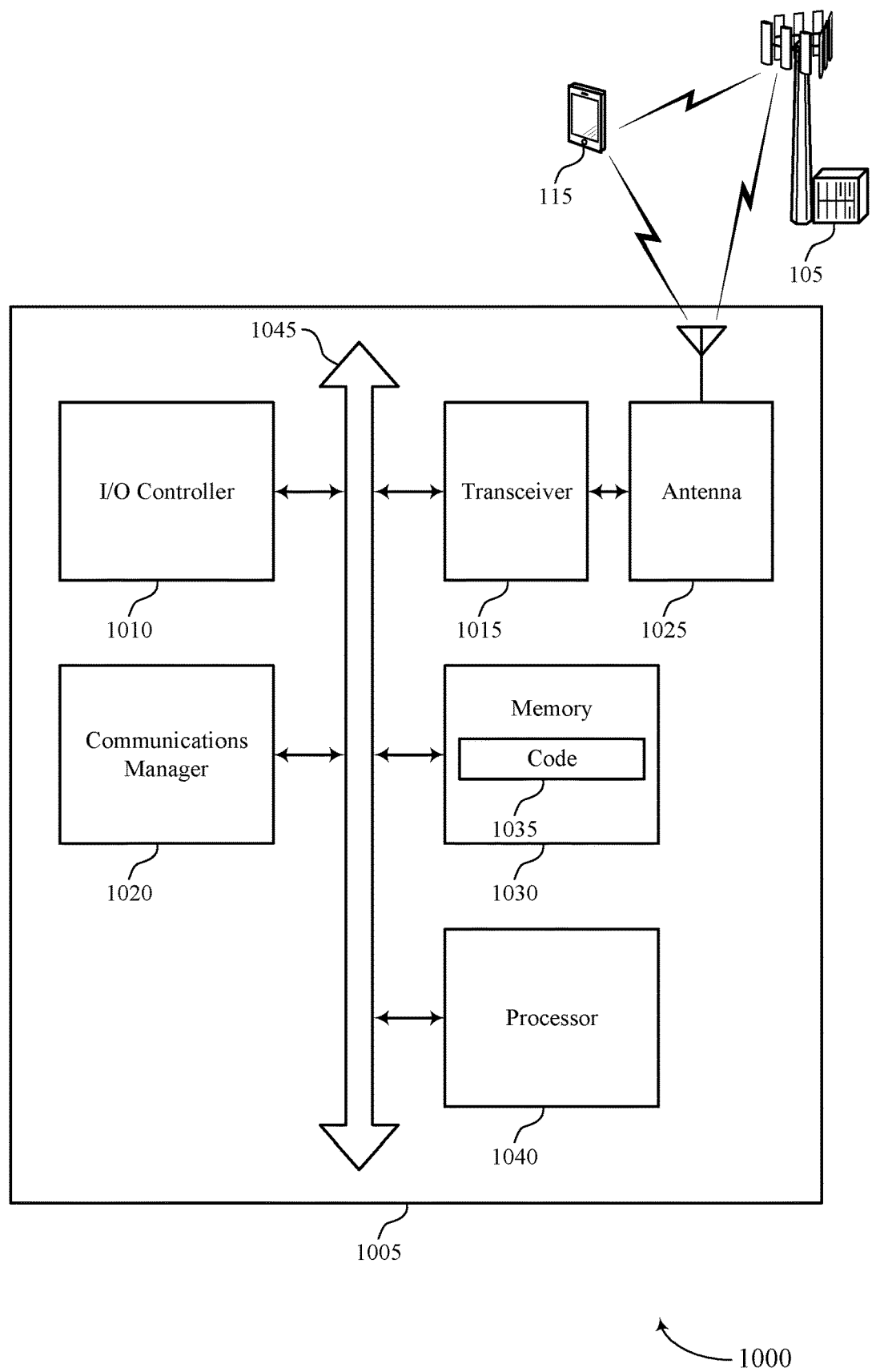
FIG. 10 shows a diagram of a system including a device that supports TCI state mode switching in accordance with aspects of the present disclosure.

FIG. 10 shows a diagram of a system 1000 including a device 1005 that supports TCI state mode switching in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting TCI state mode switching). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The communications manager 1020 may be configured as or otherwise support a means for identifying, based on a configuration for determining a TCI state to use after switching between the first TCI mode and the second TCI mode, the TCI state based on switching between the first TCI mode and the second TCI mode. The communications manager 1020 may be configured as or otherwise support a means for communicating with a network entity using the TCI state based on the identifying.

Additionally or alternatively, the communications manager 1020 may support wireless communications at a UE in accordance with examples as disclosed herein. For example, the communications manager 1020 may be configured as or otherwise support a means for identifying a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. The communications manager 1020 may be configured as or otherwise support a means for transmitting uplink signaling based on the trigger event. The communications manager 1020 may be configured as or otherwise support a means for switching between the first TCI mode and the second TCI mode for communicating based on transmitting the uplink signaling.

Additionally or alternatively, the communications manager 1020 may support wireless communications at a UE in accordance with examples as disclosed herein. For example, the communications manager 1020 may be configured as or otherwise support a means for identifying a TCI configuration having unconfigured power control parameters associated with a TCI mode, the TCI mode supporting at least one of a joint TCI state for an uplink transmission and a downlink reception and separate TCI states for the uplink transmission and the downlink reception. The communications manager 1020 may be configured as or otherwise support a means for determining a common power control configuration based on the identifying and applying a rule to the TCI configuration to determine one or more power control parameters of the unconfigured power control parameters. The communications manager 1020 may be configured as or otherwise support a means for communicating based on the common power control configuration.

By including or configuring the communications manager 1020 in accordance with examples as described herein, the device 1005 may support techniques for a UE to identify a TCI state to use for communications with a base station after switching between TCI modes, autonomously switch between the TCI modes based on a trigger event, and determine a common power control configuration based on applying a rule to a TCI configuration without power control parameters, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of TCI state mode switching as described herein, or the processor 1040 and the memory 1030 may be otherwise configured to perform or support such operations.

Figure 11:
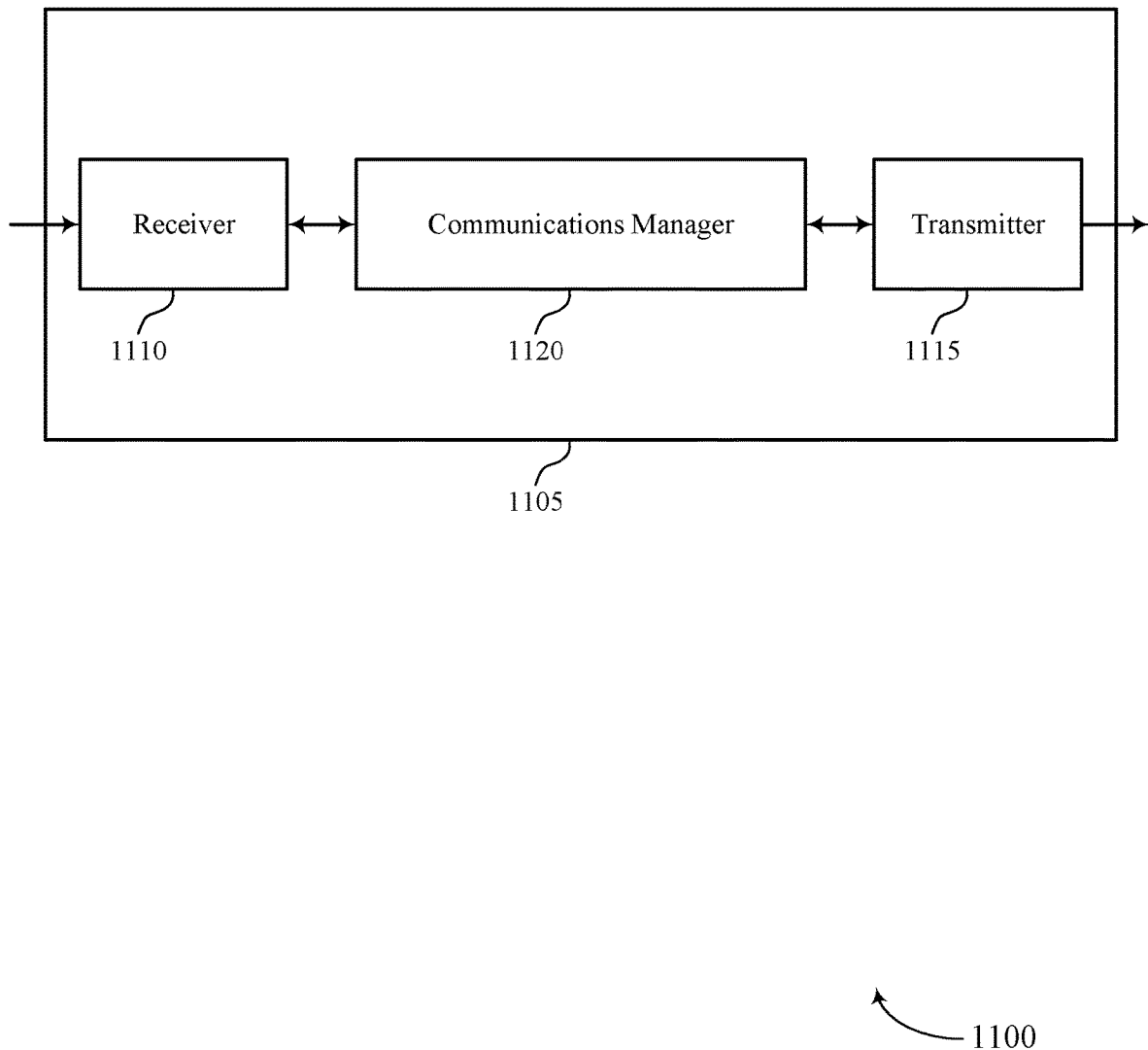
FIGS. 11 and 12 show block diagrams of devices that support TCI state mode switching in accordance with aspects of the present disclosure.

FIG. 11 shows a block diagram 1100 of a device 1105 that supports TCI state mode switching in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to TCI state mode switching). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to TCI state mode switching). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of TCI state mode switching as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a UE signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The communications manager 1120 may be configured as or otherwise support a means for identifying, based on a configuration for determining a TCI state to use after switching between the first TCI mode and the second TCI mode, the TCI state based on switching between the first TCI mode and the second TCI mode. The communications manager 1120 may be configured as or otherwise support a means for communicating with the UE using the TCI state based on the identifying.

Additionally or alternatively, the communications manager 1120 may support wireless communications at a base station in accordance with examples as disclosed herein. For example, the communications manager 1120 may be configured as or otherwise support a means for receiving, from a UE, uplink signaling based on a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. The communications manager 1120 may be configured as or otherwise support a means for switching between the first TCI mode and the second TCI mode for communicating based on receiving the uplink signaling.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for a UE to identify a TCI state to use for communications with a base station after switching between TCI modes, autonomously switch between the TCI modes based on a trigger event, and determine a common power control configuration based on applying a rule to a TCI configuration without power control parameters, which may cause reduced processing, reduced power consumption, more efficient utilization of communication resources, and the like.

Figure 12:
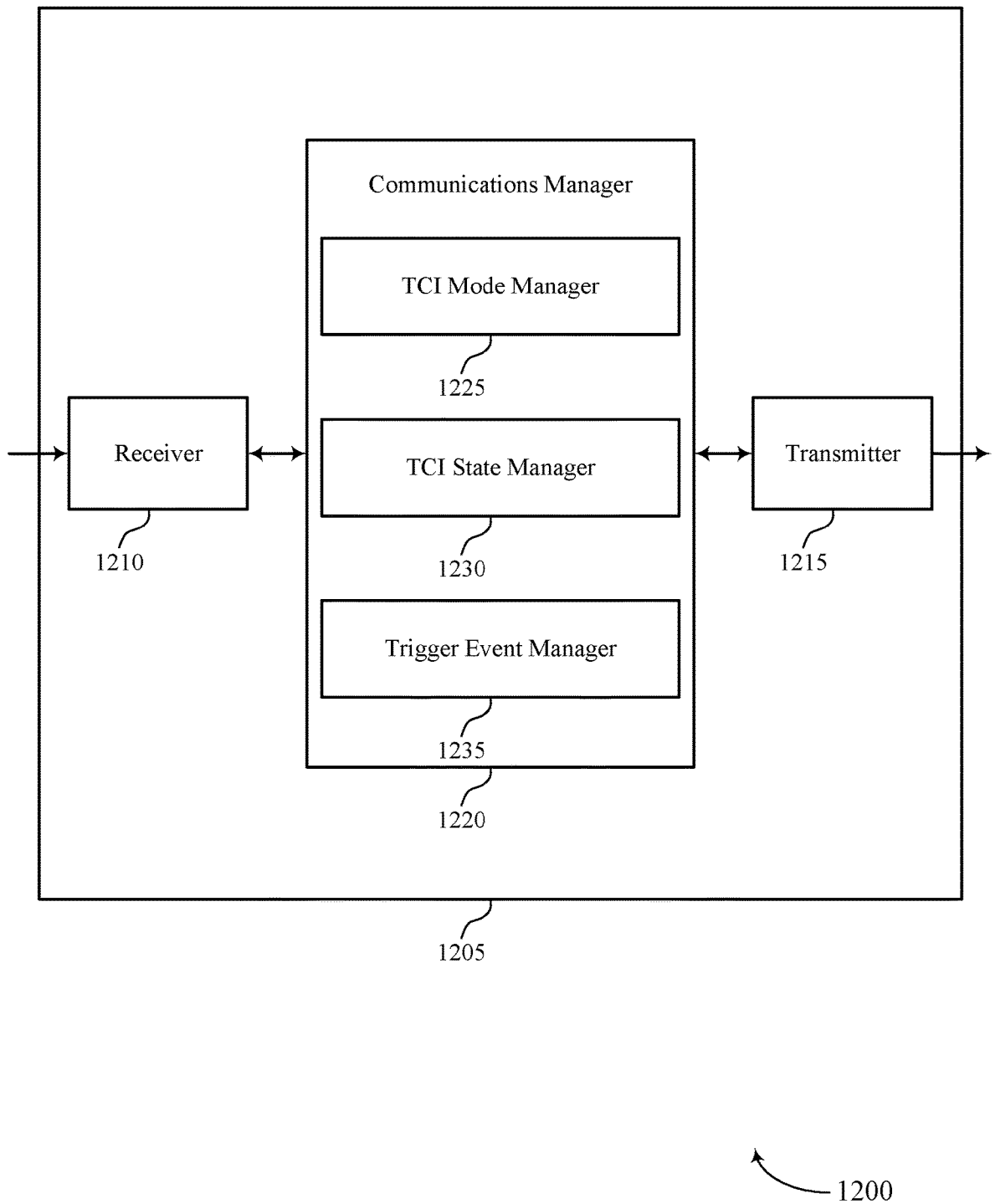

FIG. 12 shows a block diagram 1200 of a device 1205 that supports TCI state mode switching in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to TCI state mode switching). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to TCI state mode switching). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of TCI state mode switching as described herein. For example, the communications manager 1220 may include a TCI mode manager 1225, a TCI state manager 1230, a trigger event manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The TCI mode manager 1225 may be configured as or otherwise support a means for transmitting, to a UE signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The TCI state manager 1230 may be configured as or otherwise support a means for identifying, based on a configuration for determining a TCI state to use after switching between the first TCI mode and the second TCI mode, the TCI state based on switching between the first TCI mode and the second TCI mode. The TCI state manager 1230 may be configured as or otherwise support a means for communicating with the UE using the TCI state based on the identifying.

Additionally or alternatively, the communications manager 1220 may support wireless communications at a base station in accordance with examples as disclosed herein. The trigger event manager 1235 may be configured as or otherwise support a means for receiving, from a UE, uplink signaling based on a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. The TCI mode manager 1225 may be configured as or otherwise support a means for switching between the first TCI mode and the second TCI mode for communicating based on receiving the uplink signaling.

Figure 13:
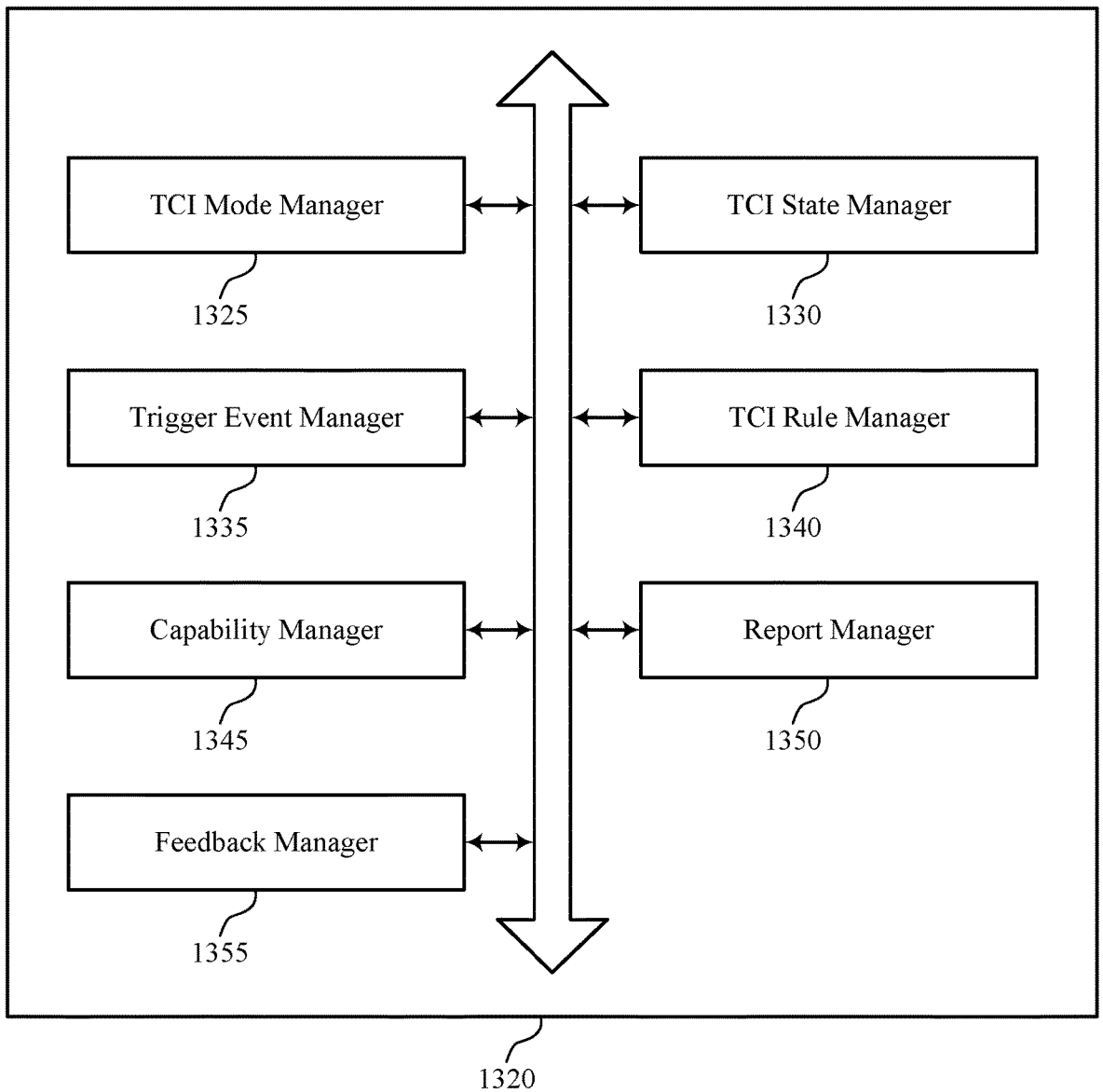
FIG. 13 shows a block diagram of a communications manager that supports TCI state mode switching in accordance with aspects of the present disclosure.

FIG. 13 shows a block diagram 1300 of a communications manager 1320 that supports TCI state mode switching in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of TCI state mode switching as described herein. For example, the communications manager 1320 may include a TCI mode manager 1325, a TCI state manager 1330, a trigger event manager 1335, a TCI rule manager 1340, a capability manager 1345, a report manager 1350, a feedback manager 1355, or any combination thereof. Each of these components may communicate, directly or indirectly, with one another (e.g., via one or more buses).

The communications manager 1320 may support wireless communications at a base station in accordance with examples as disclosed herein. The TCI mode manager 1325 may be configured as or otherwise support a means for transmitting, to a UE signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The TCI state manager 1330 may be configured as or otherwise support a means for identifying, based on a configuration for determining a TCI state to use after switching between the first TCI mode and the second TCI mode, the TCI state based on switching between the first TCI mode and the second TCI mode. In some examples, the TCI state manager 1330 may be configured as or otherwise support a means for communicating with the UE using the TCI state based on the identifying.

In some examples, to support identifying the TCI state, the TCI state manager 1330 may be configured as or otherwise support a means for transmitting an indication of the TCI state in the signaling.

In some examples, to support identifying the TCI state, the TCI rule manager 1340 may be configured as or otherwise support a means for identifying a rule corresponding to the TCI state, where the rule defines the TCI state based on an initial TCI state from before switching between the first TCI mode and the second TCI mode.

In some examples, the TCI mode manager 1325 may be configured as or otherwise support a means for determining to switch between the first TCI mode or the second TCI mode and a third TCI mode simultaneous to switching between the first TCI mode and the second TCI mode, where the third TCI mode supports at least one of the joint TCI state and the separate TCI states.

In some examples, the TCI state manager 1330 may be configured as or otherwise support a means for receiving an indication of a downlink TCI state, an uplink TCI state, or both associated with the third TCI mode.

In some examples, the capability manager 1345 may be configured as or otherwise support a means for transmitting a message including capability information corresponding to a capability of the UE to support one or more of the first TCI mode or the second TCI mode.

In some examples, the signaling includes DCI, a MAC-CE, or RRC signaling.

Additionally or alternatively, the communications manager 1320 may support wireless communications at a base station in accordance with examples as disclosed herein. The trigger event manager 1335 may be configured as or otherwise support a means for receiving, from a UE, uplink signaling based on a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. In some examples, the TCI mode manager 1325 may be configured as or otherwise support a means for switching between the first TCI mode and the second TCI mode for communicating based on receiving the uplink signaling.

In some examples, to support receiving the uplink signaling, the report manager 1350 may be configured as or otherwise support a means for receiving a report based on determining an MPE is exceeded at the UE, detecting a beam failure, or both, where the trigger event includes the determination.

In some examples, the feedback manager 1355 may be configured as or otherwise support a means for transmitting, to the UE, a feedback message corresponding to the uplink signaling, where the switching is performed based on a timing threshold associated with the uplink signaling being satisfied.

In some examples, the feedback manager 1355 may be configured as or otherwise support a means for transmitting, to the UE, a feedback message corresponding to the uplink signaling, where the switching is based on transmitting the feedback message and a timing threshold associated with the feedback message being satisfied.

In some examples, the capability manager 1345 may be configured as or otherwise support a means for receiving a message including capability information corresponding to a capability of the UE to support one or more of the first TCI mode or the second TCI mode.

In some examples, the uplink signaling includes an indication of an uplink beam for the communicating.

Figure 14:
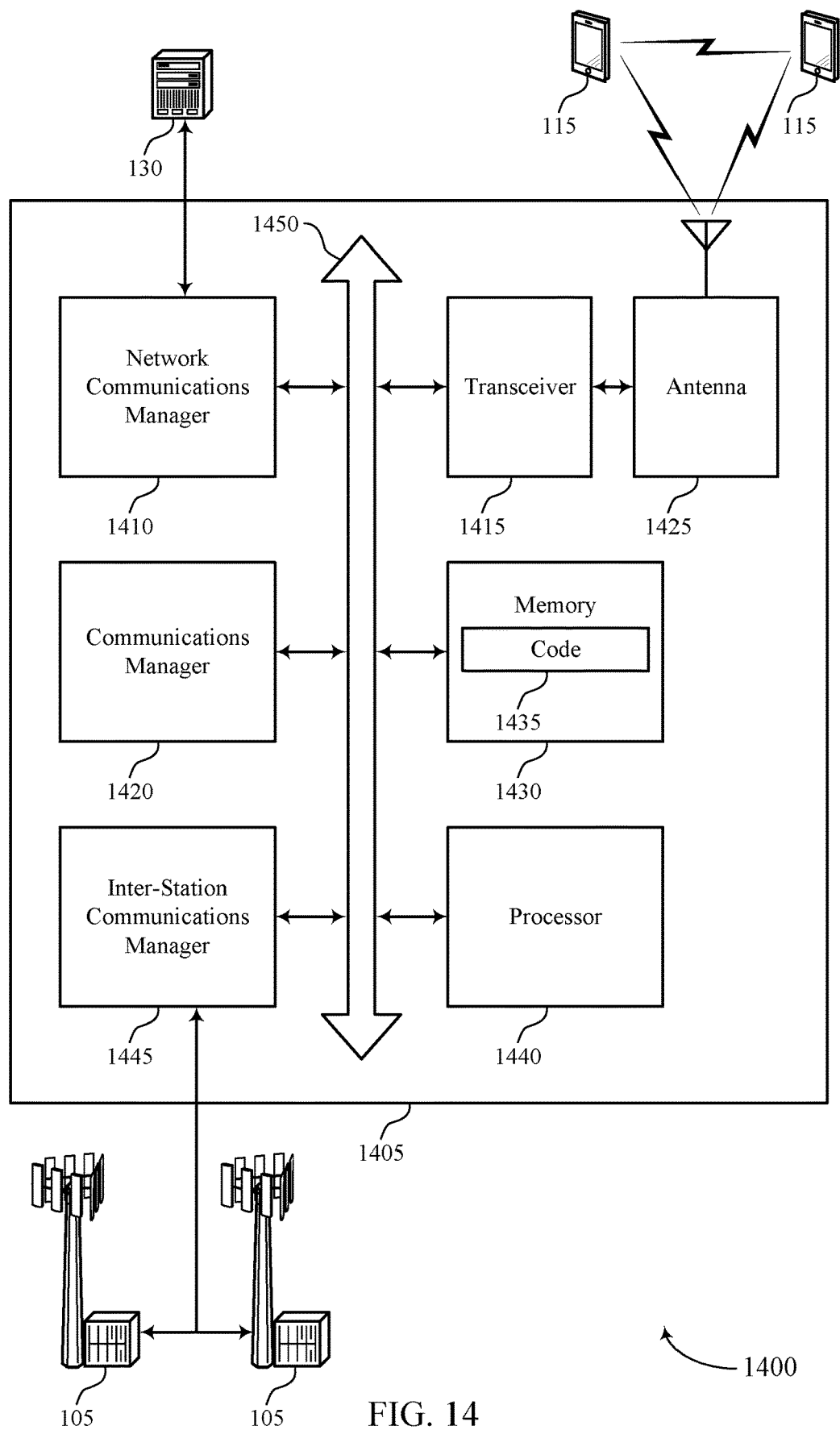
FIG. 14 shows a diagram of a system including a device that supports TCI state mode switching in accordance with aspects of the present disclosure.

FIG. 14 shows a diagram of a system 1400 including a device 1405 that supports TCI state mode switching in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting TCI state mode switching). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a UE signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The communications manager 1420 may be configured as or otherwise support a means for identifying, based on a configuration for determining a TCI state to use after switching between the first TCI mode and the second TCI mode, the TCI state based on switching between the first TCI mode and the second TCI mode. The communications manager 1420 may be configured as or otherwise support a means for communicating with the UE using the TCI state based on the identifying.

Additionally or alternatively, the communications manager 1420 may support wireless communications at a base station in accordance with examples as disclosed herein. For example, the communications manager 1420 may be configured as or otherwise support a means for receiving, from a UE, uplink signaling based on a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. The communications manager 1420 may be configured as or otherwise support a means for switching between the first TCI mode and the second TCI mode for communicating based on receiving the uplink signaling.

By including or configuring the communications manager 1420 in accordance with examples as described herein, the device 1405 may support techniques for a UE to identify a TCI state to use for communications with a base station after switching between TCI modes, autonomously switch between the TCI modes based on a trigger event, and determine a common power control configuration based on applying a rule to a TCI configuration without power control parameters, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of TCI state mode switching as described herein, or the processor 1440 and the memory 1430 may be otherwise configured to perform or support such operations.

Figure 15:
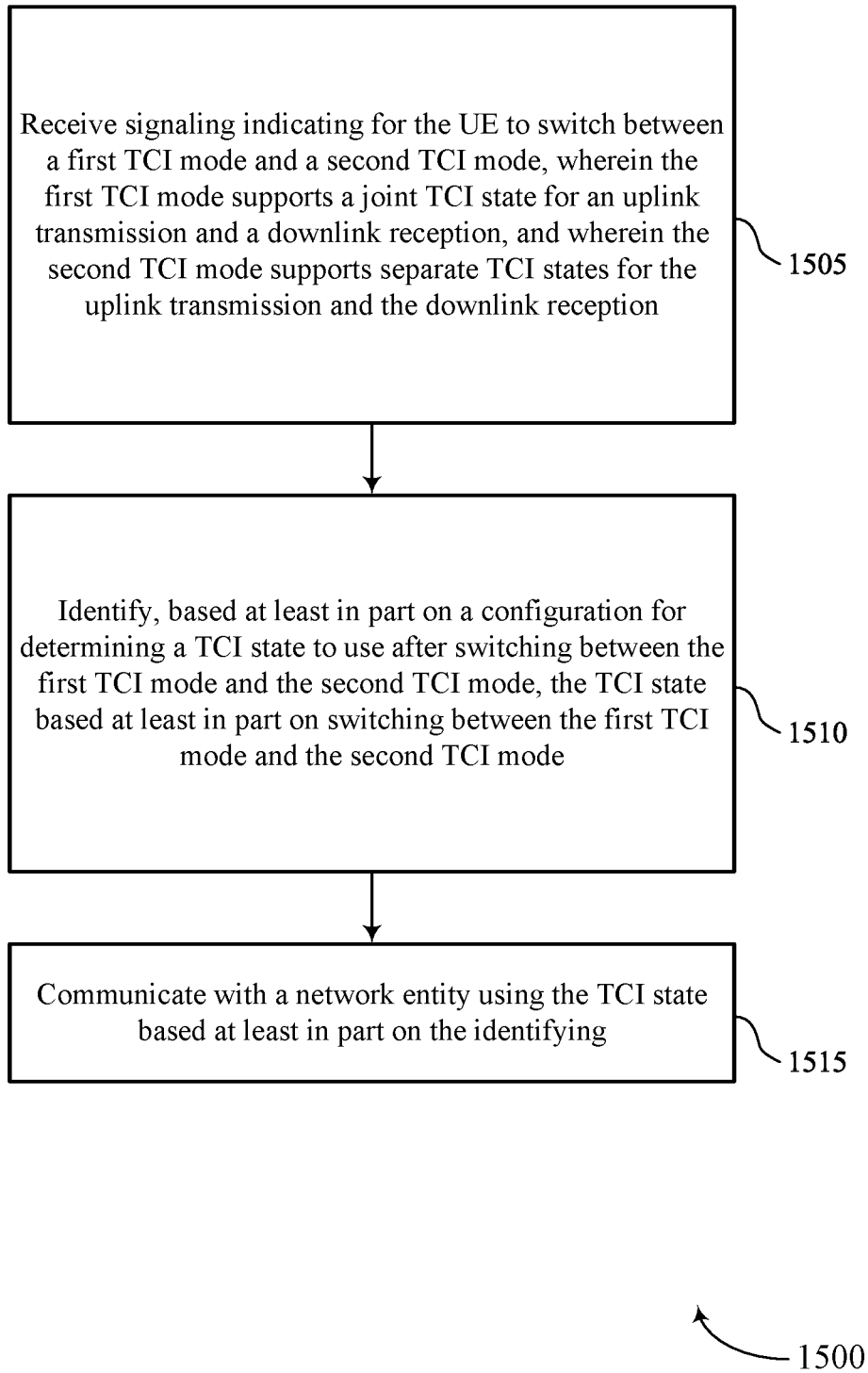
FIGS. 15 through 22 show flowcharts illustrating methods that support TCI state mode switching in accordance with aspects of the present disclosure.

FIG. 15 shows a flowchart illustrating a method 1500 that supports TCI state mode switching in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The operations of 1505 may be performed in accordance with examples as disclosed herein. In some examples, aspects of the operations of 1505 may be performed by a TCI mode component 925 as described with reference to FIG. 9.

At 1510, the method may include identifying, based on a configuration for determining a TCI state to use after switching between the first TCI mode and the second TCI mode, the TCI state based on switching between the first TCI mode and the second TCI mode. The operations of 1510 may be performed in accordance with examples as disclosed herein. In some examples, aspects of the operations of 1510 may be performed by a TCI state component 930 as described with reference to FIG. 9.

At 1515, the method may include communicating with a network entity using the TCI state based on the identifying. The operations of 1515 may be performed in accordance with examples as disclosed herein. In some examples, aspects of the operations of 1515 may be performed by a TCI state component 930 as described with reference to FIG. 9.

Figure 16:
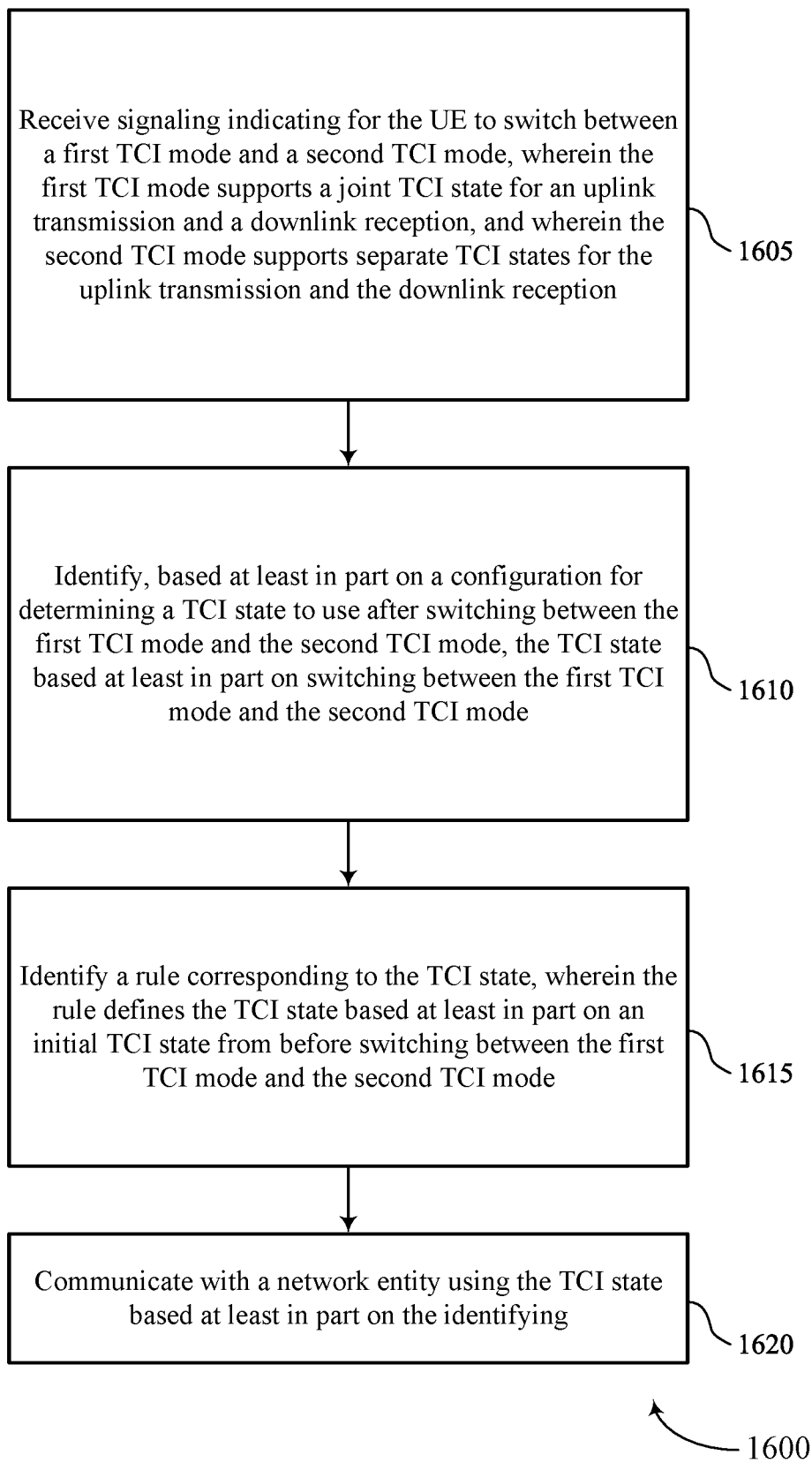

FIG. 16 shows a flowchart illustrating a method 1600 that supports TCI state mode switching in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The operations of 1605 may be performed in accordance with examples as disclosed herein. In some examples, aspects of the operations of 1605 may be performed by a TCI mode component 925 as described with reference to FIG. 9.

At 1610, the method may include identifying, based on a configuration for determining a TCI state to use after switching between the first TCI mode and the second TCI mode, the TCI state based on switching between the first TCI mode and the second TCI mode. The operations of 1610 may be performed in accordance with examples as disclosed herein. In some examples, aspects of the operations of 1610 may be performed by a TCI state component 930 as described with reference to FIG. 9.

At 1615, the method may include identifying a rule corresponding to the TCI state, where the rule defines the TCI state based on an initial TCI state from before switching between the first TCI mode and the second TCI mode. The operations of 1615 may be performed in accordance with examples as disclosed herein. In some examples, aspects of the operations of 1615 may be performed by a TCI rule component 950 as described with reference to FIG. 9.

At 1620, the method may include communicating with a network entity using the TCI state based on the identifying. The operations of 1620 may be performed in accordance with examples as disclosed herein. In some examples, aspects of the operations of 1620 may be performed by a TCI state component 930 as described with reference to FIG. 9.

Figure 17:
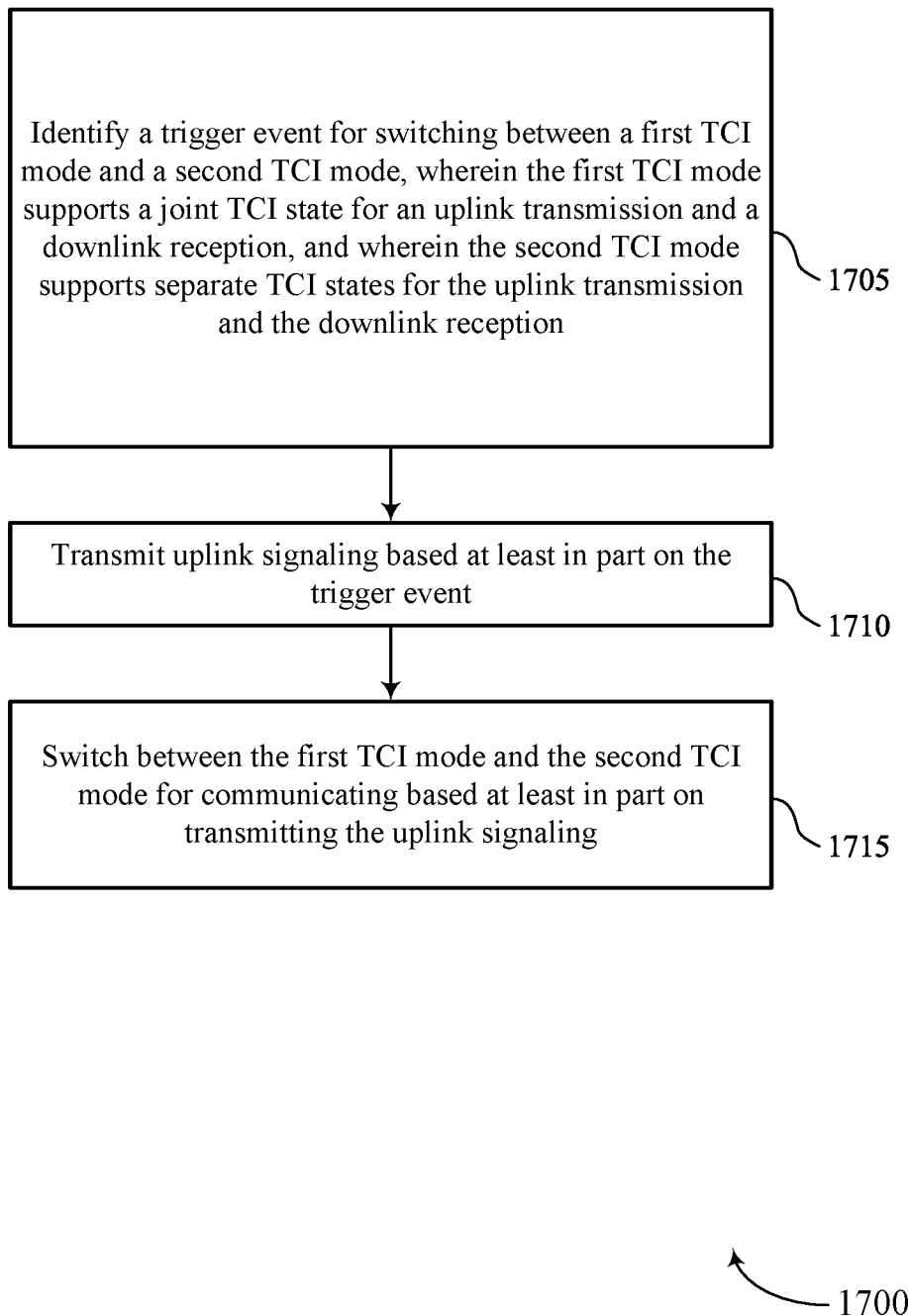

FIG. 17 shows a flowchart illustrating a method 1700 that supports TCI state mode switching in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include identifying a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. The operations of 1705 may be performed in accordance with examples as disclosed herein. In some examples, aspects of the operations of 1705 may be performed by a trigger event component 935 as described with reference to FIG. 9.

At 1710, the method may include transmitting uplink signaling based on the trigger event. The operations of 1710 may be performed in accordance with examples as disclosed herein. In some examples, aspects of the operations of 1710 may be performed by a report component 940 as described with reference to FIG. 9.

At 1715, the method may include switching between the first TCI mode and the second TCI mode for communicating based on transmitting the uplink signaling. The operations of 1715 may be performed in accordance with examples as disclosed herein. In some examples, aspects of the operations of 1715 may be performed by a TCI mode component 925 as described with reference to FIG. 9.

Figure 18:
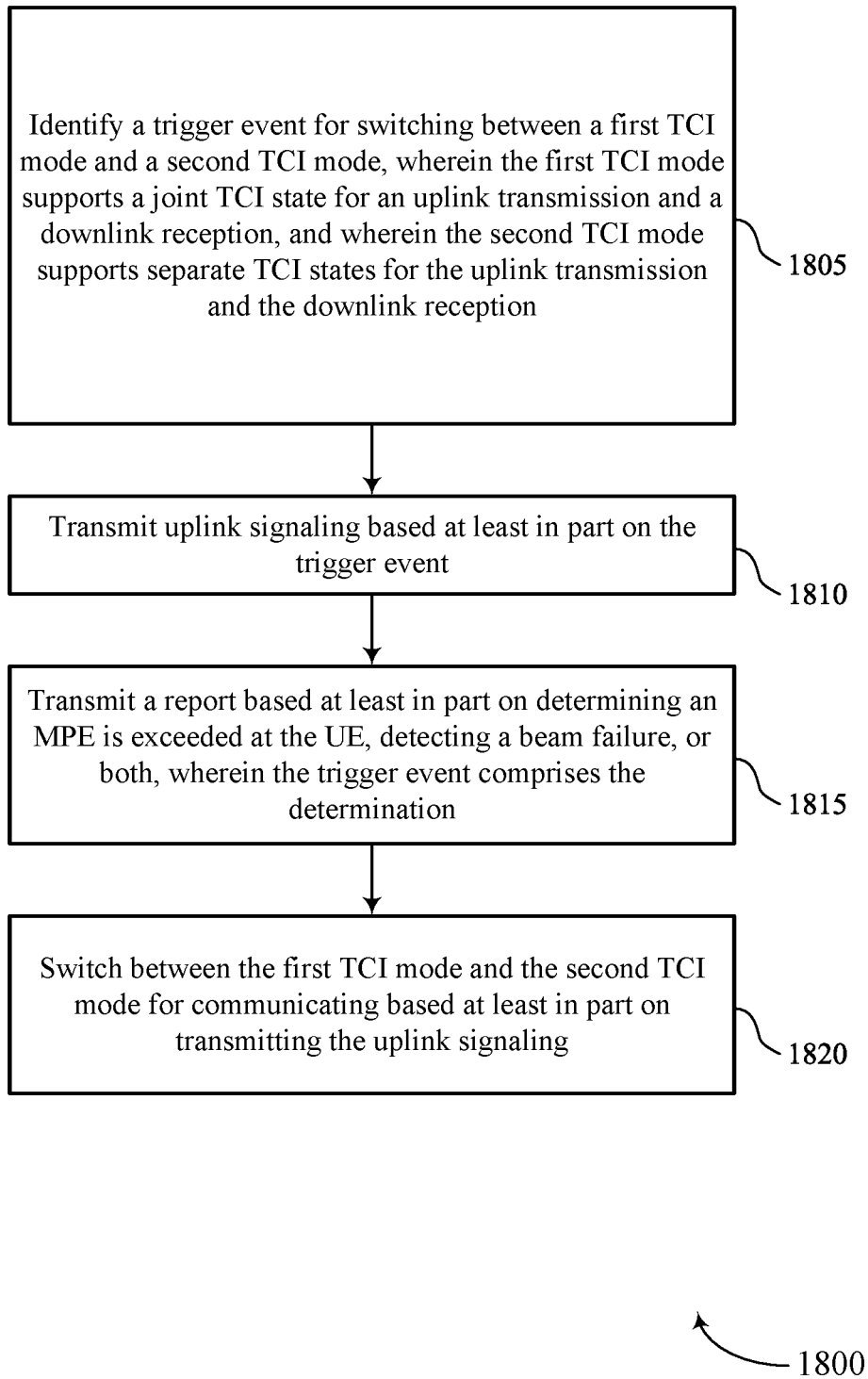

FIG. 18 shows a flowchart illustrating a method 1800 that supports TCI state mode switching in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include identifying a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. The operations of 1805 may be performed in accordance with examples as disclosed herein. In some examples, aspects of the operations of 1805 may be performed by a trigger event component 935 as described with reference to FIG. 9.

At 1810, the method may include transmitting uplink signaling based on the trigger event. The operations of 1810 may be performed in accordance with examples as disclosed herein. In some examples, aspects of the operations of 1810 may be performed by a report component 940 as described with reference to FIG. 9.

At 1815, the method may include transmitting a report based on determining an MPE is exceeded at the UE, detecting a beam failure, or both, where the trigger event includes the determination. The operations of 1815 may be performed in accordance with examples as disclosed herein. In some examples, aspects of the operations of 1815 may be performed by a report component 940 as described with reference to FIG. 9.

At 1820, the method may include switching between the first TCI mode and the second TCI mode for communicating based on transmitting the uplink signaling. The operations of 1820 may be performed in accordance with examples as disclosed herein. In some examples, aspects of the operations of 1820 may be performed by a TCI mode component 925 as described with reference to FIG. 9.

Figure 19:
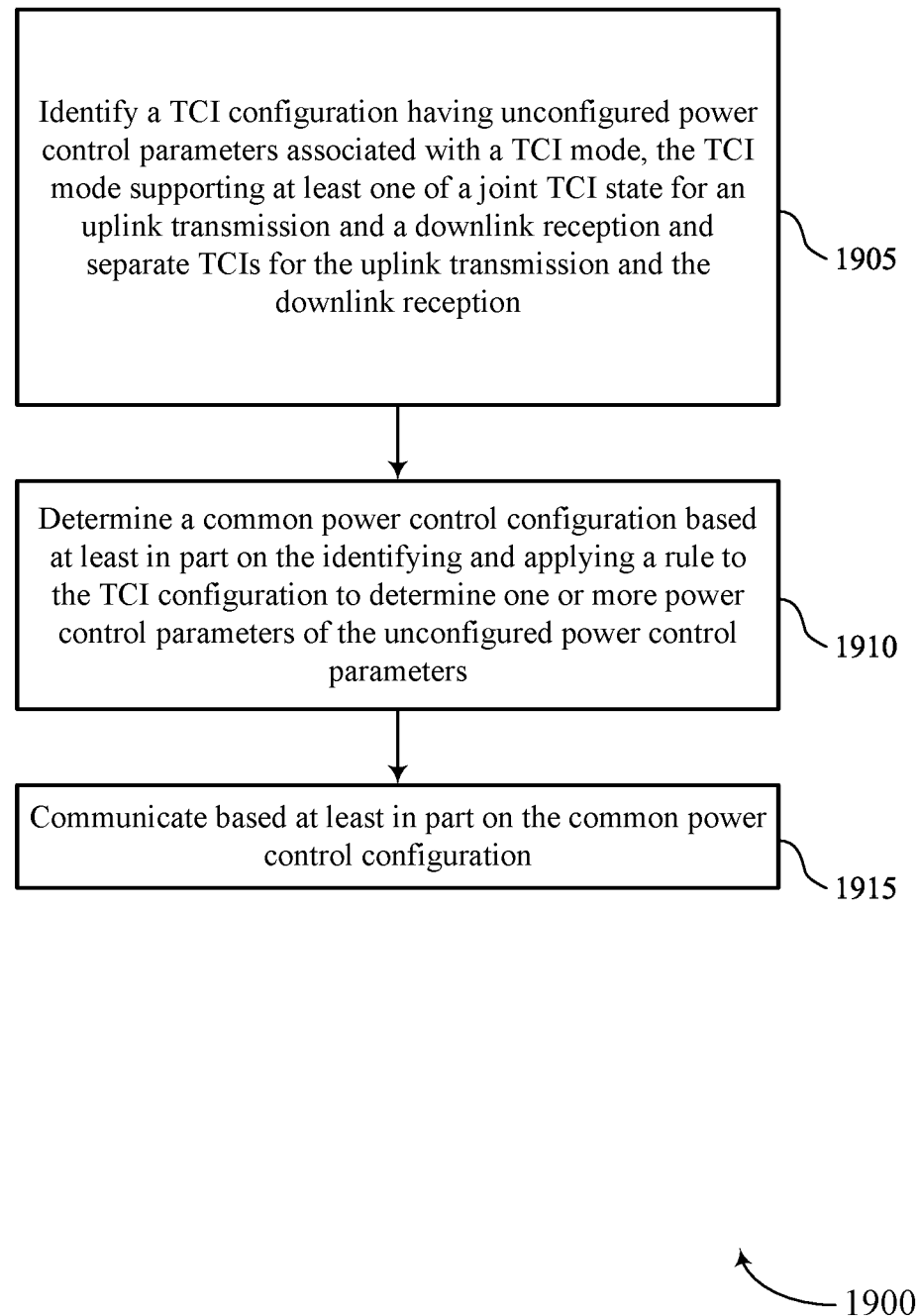

FIG. 19 shows a flowchart illustrating a method 1900 that supports TCI state mode switching in accordance with aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1905, the method may include identifying a TCI configuration having unconfigured power control parameters associated with a TCI mode, the TCI mode supporting at least one of a joint TCI state for an uplink transmission and a downlink reception and separate TCI states for the uplink transmission and the downlink reception. The operations of 1905 may be performed in accordance with examples as disclosed herein. In some examples, aspects of the operations of 1905 may be performed by a power control component 945 as described with reference to FIG. 9.

At 1910, the method may include determining a common power control configuration based on the identifying and applying a rule to the TCI configuration to determine one or more power control parameters of the unconfigured power control parameters. The operations of 1910 may be performed in accordance with examples as disclosed herein. In some examples, aspects of the operations of 1910 may be performed by a TCI rule component 950 as described with reference to FIG. 9.

At 1915, the method may include communicating based on the common power control configuration. The operations of 1915 may be performed in accordance with examples as disclosed herein. In some examples, aspects of the operations of 1915 may be performed by a power control component 945 as described with reference to FIG. 9.

Figure 20:
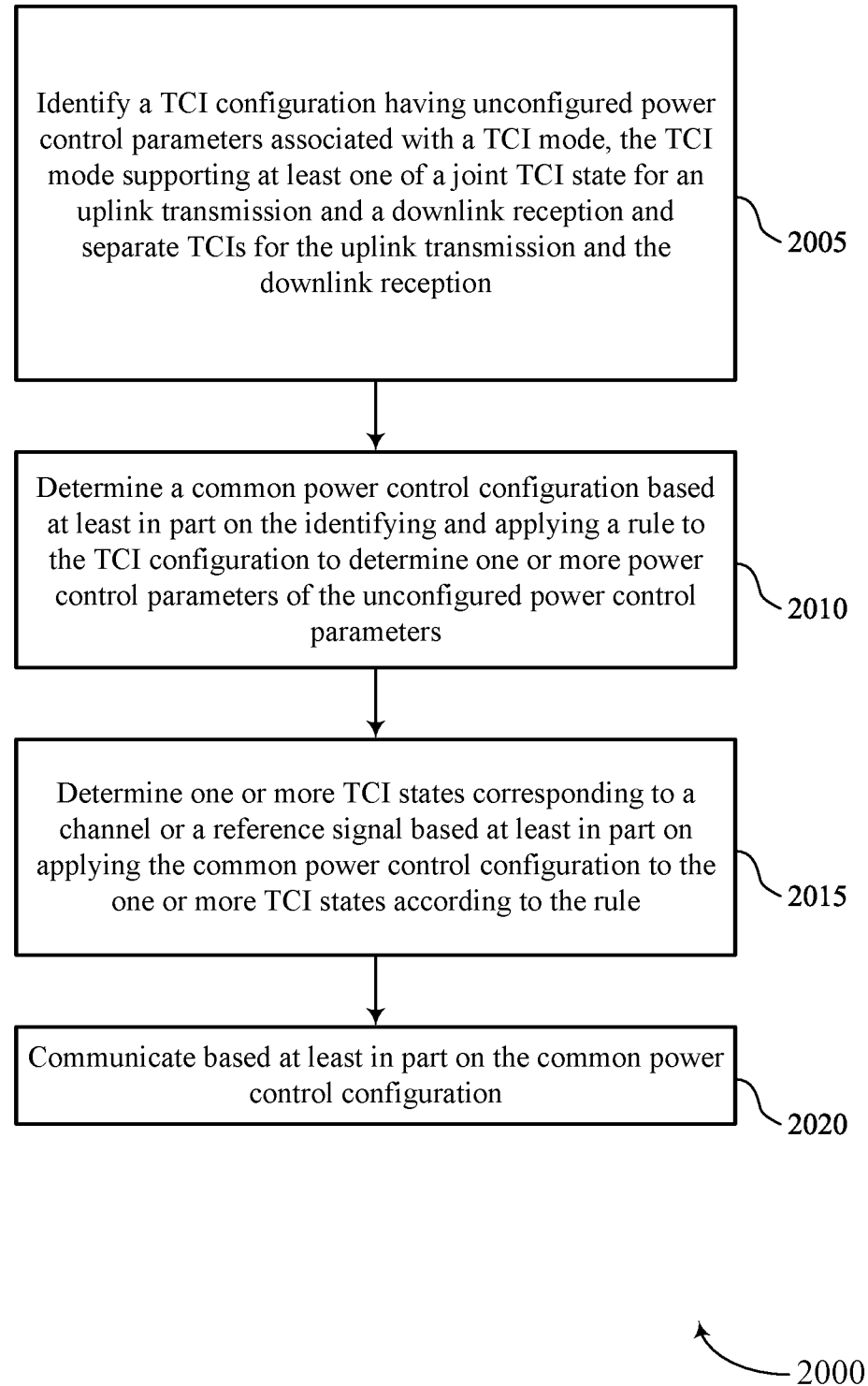

FIG. 20 shows a flowchart illustrating a method 2000 that supports TCI state mode switching in accordance with aspects of the present disclosure. The operations of the method 2000 may be implemented by a UE or its components as described herein. For example, the operations of the method 2000 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 2005, the method may include identifying a TCI configuration having unconfigured power control parameters associated with a TCI mode, the TCI mode supporting at least one of a joint TCI state for an uplink transmission and a downlink reception and separate TCI states for the uplink transmission and the downlink reception. The operations of 2005 may be performed in accordance with examples as disclosed herein. In some examples, aspects of the operations of 2005 may be performed by a power control component 945 as described with reference to FIG. 9.

At 2010, the method may include determining a common power control configuration based on the identifying and applying a rule to the TCI configuration to determine one or more power control parameters of the unconfigured power control parameters. The operations of 2010 may be performed in accordance with examples as disclosed herein. In some examples, aspects of the operations of 2010 may be performed by a TCI rule component 950 as described with reference to FIG. 9.

At 2015, the method may include determining one or more TCI states corresponding to a channel or a reference signal based on applying the common power control configuration to the one or more TCI states according to the rule. The operations of 2015 may be performed in accordance with examples as disclosed herein. In some examples, aspects of the operations of 2015 may be performed by a TCI state component 930 as described with reference to FIG. 9.

At 2020, the method may include communicating based on the common power control configuration. The operations of 2020 may be performed in accordance with examples as disclosed herein. In some examples, aspects of the operations of 2020 may be performed by a power control component 945 as described with reference to FIG. 9.

Figure 21:
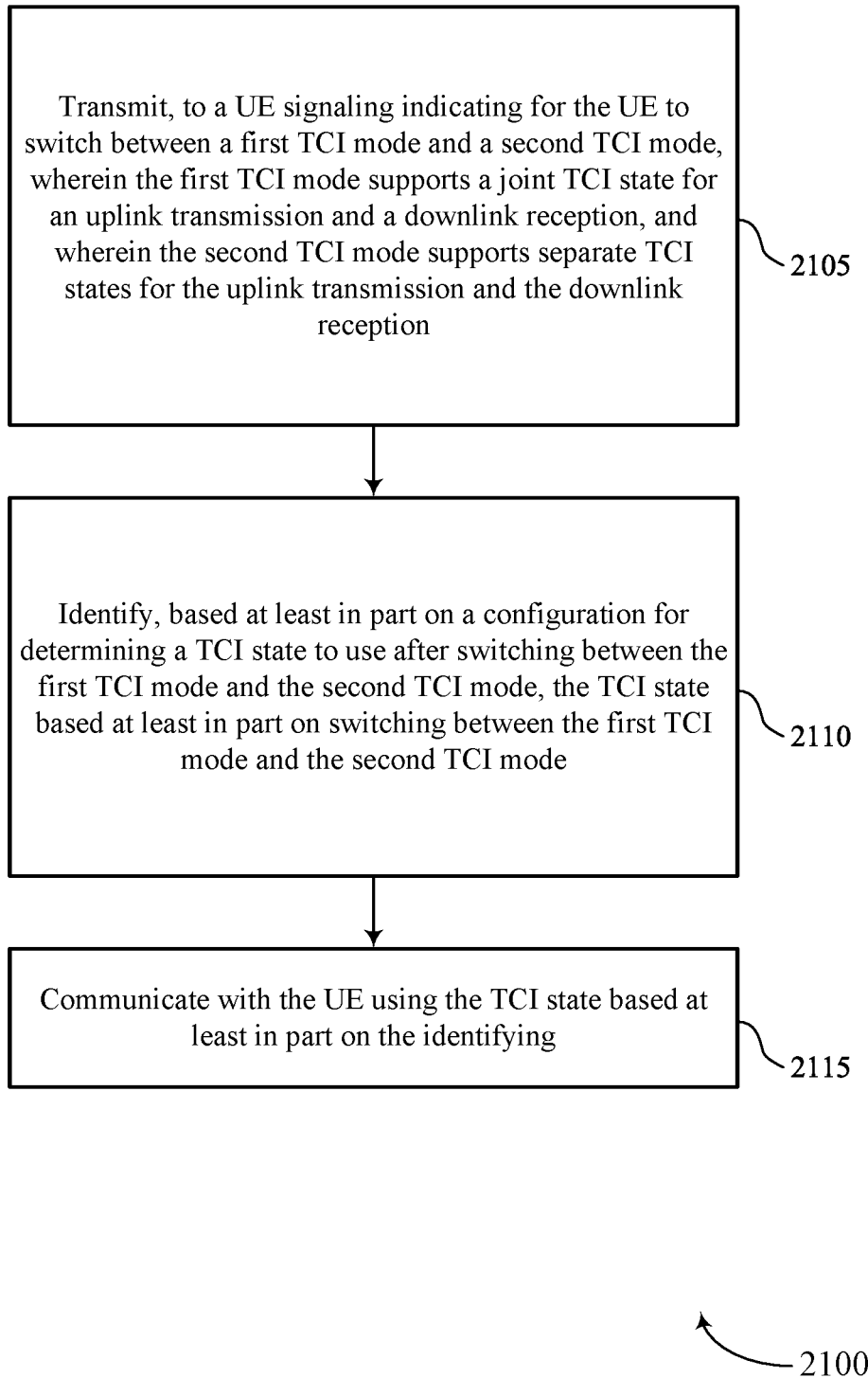

FIG. 21 shows a flowchart illustrating a method 2100 that supports TCI state mode switching in accordance with aspects of the present disclosure. The operations of the method 2100 may be implemented by a base station or its components as described herein. For example, the operations of the method 2100 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, signaling indicating for the UE to switch between a first TCI mode and a second TCI mode, where the first TCI mode supports a joint TCI state for an uplink transmission and a downlink reception, and where the second TCI mode supports separate TCI states for the uplink transmission and the downlink reception. The operations of 2105 may be performed in accordance with examples as disclosed herein. In some examples, aspects of the operations of 2105 may be performed by a TCI mode manager 1325 as described with reference to FIG. 13.

At 2110, the method may include identifying, based on a configuration for determining a TCI state to use after switching between the first TCI mode and the second TCI mode, the TCI state based on switching between the first TCI mode and the second TCI mode. The operations of 2110 may be performed in accordance with examples as disclosed herein. In some examples, aspects of the operations of 2110 may be performed by a TCI state manager 1330 as described with reference to FIG. 13.

At 2115, the method may include communicating with the UE using the TCI state based on the identifying. The operations of 2115 may be performed in accordance with examples as disclosed herein. In some examples, aspects of the operations of 2115 may be performed by a TCI state manager 1330 as described with reference to FIG. 13.

Figure 22:
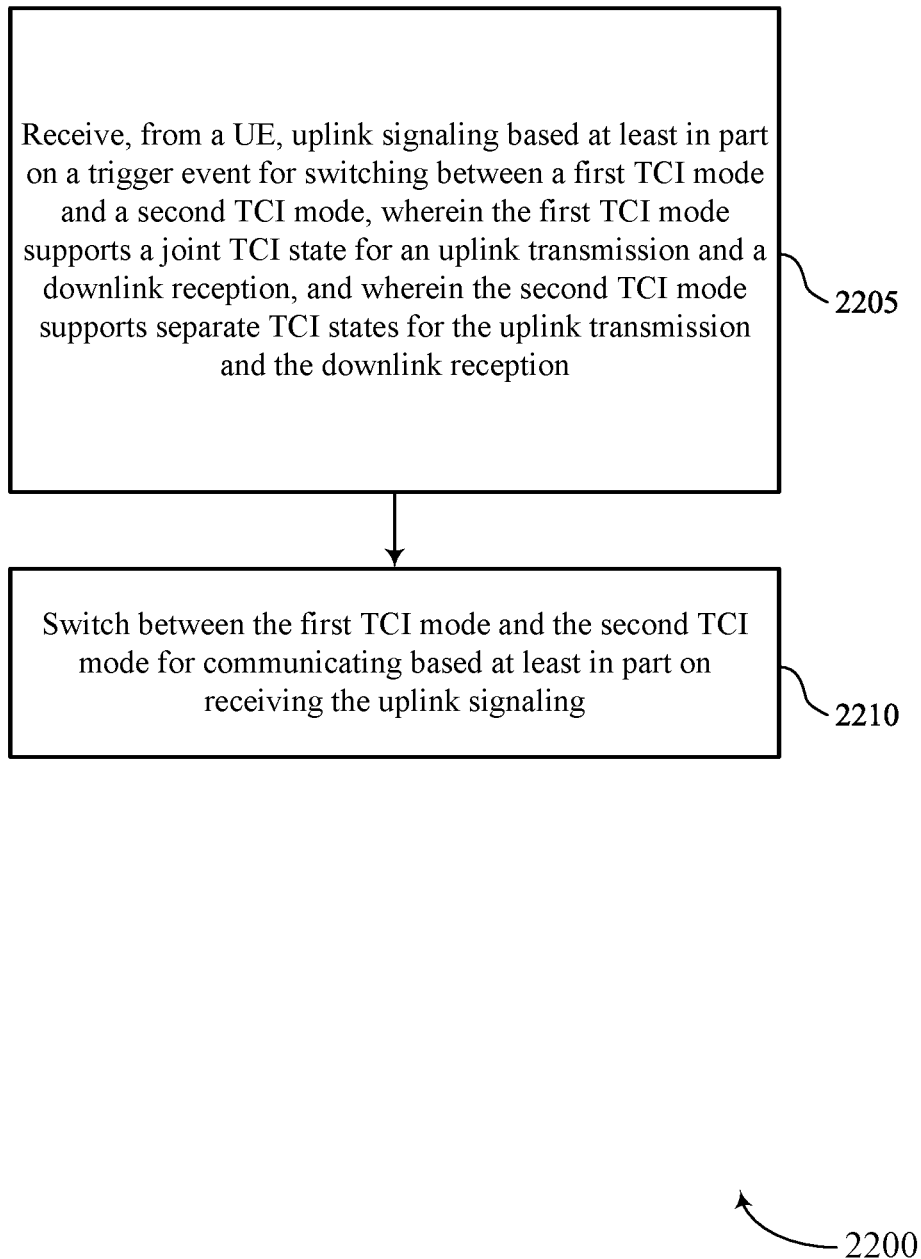

FIG. 22 shows a flowchart illustrating a method 2200 that supports TCI state mode switching in accordance with aspects of the present disclosure. The operations of the method 2200 may be implemented by a base station or its components as described herein. For example, the operations of the method 2200 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2205, the method may include receiving, from a UE, uplink signaling based on a trigger event for switching between a first TCI mode and a second TCI mode, where the first TCI mode supports a joint TCI state for an uplink transmission and a downlink reception, and where the second TCI mode supports separate TCI states for the uplink transmission and the downlink reception. The operations of 2205 may be performed in accordance with examples as disclosed herein. In some examples, aspects of the operations of 2205 may be performed by a trigger event manager 1335 as described with reference to FIG. 13.

At 2210, the method may include switching between the first TCI mode and the second TCI mode for communicating based on receiving the uplink signaling. The operations of 2210 may be performed in accordance with examples as disclosed herein. In some examples, aspects of the operations of 2210 may be performed by a TCI mode manager 1325 as described with reference to FIG. 13.

The following provides an overview of aspects of the present disclosure:

Aspect 1: A method for wireless communications at a UE, comprising: receiving signaling indicating for the UE to switch between a first transmission configuration indicator mode and a second transmission configuration indicator mode, wherein the first transmission configuration indicator mode supports a joint transmission configuration indicator state for an uplink transmission and a downlink reception, and wherein the second transmission configuration indicator mode supports separate transmission configuration indicator states for the uplink transmission and the downlink reception; identifying, based at least in part on a configuration for determining a transmission configuration indicator state to use after switching between the first transmission configuration indicator mode and the second transmission configuration indicator mode, the transmission configuration indicator state based at least in part on switching between the first transmission configuration indicator mode and the second transmission configuration indicator mode; and communicating with a network entity using the transmission configuration indicator state based at least in part on the identifying.

Aspect 2: The method of aspect 1, wherein identifying the transmission configuration indicator state comprises: receiving an indication of the transmission configuration indicator state in the signaling.

Aspect 3: The method of aspect 1, wherein identifying the transmission configuration indicator state comprises: identifying a rule corresponding to the transmission configuration indicator state, wherein the rule defines the transmission configuration indicator state based at least in part on an initial transmission configuration indicator state from before switching between the first transmission configuration indicator mode and the second transmission configuration indicator mode.

Aspect 4: The method of any of aspects 1 through 3, further comprising: determining to switch between the first transmission configuration indicator mode or the second transmission configuration indicator mode and a third transmission configuration indicator mode simultaneous to switching between the first transmission configuration indicator mode and the second transmission configuration indicator mode, wherein the third transmission configuration indicator mode supports at least one of the joint transmission configuration indicator state and the separate transmission configuration indicator states.

Aspect 5: The method of aspect 4, further comprising: receiving an indication of a downlink transmission configuration indicator state, an uplink transmission configuration indicator state, or both associated with the third transmission configuration indicator mode.

Aspect 6: The method of any of aspects 1 through 5, further comprising: transmitting a message comprising capability information corresponding to a capability of the UE to support one or more of the first transmission configuration indicator mode or the second transmission configuration indicator mode.

Aspect 7: The method of any of aspects 1 through 6, wherein the signaling comprises downlink control information, a medium access control-control element, or radio resource control signaling.

Aspect 8: A method for wireless communications at a UE, comprising: identifying a trigger event for switching between a first transmission configuration indicator mode and a second transmission configuration indicator mode, wherein the first transmission configuration indicator mode supports a joint transmission configuration indicator state for an uplink transmission and a downlink reception, and wherein the second transmission configuration indicator mode supports separate transmission configuration indicator states for the uplink transmission and the downlink reception; transmitting uplink signaling based at least in part on the trigger event; and switching between the first transmission configuration indicator mode and the second transmission configuration indicator mode for communicating based at least in part on transmitting the uplink signaling.

Aspect 9: The method of aspect 8, wherein transmitting the uplink signaling comprises: transmitting a report based at least in part on determining a maximum permissible exposure is exceeded at the UE, detecting a beam failure, or both, wherein the trigger event comprises the determination.

Aspect 10: The method of any of aspects 8 through 9, further comprising: receiving a feedback message corresponding to the uplink signaling after switching between the first transmission configuration indicator mode and the second transmission configuration indicator mode, wherein the switching is performed based at least in part on a timing threshold associated with the uplink signaling being satisfied.

Aspect 11: The method of any of aspects 8 through 9, further comprising: receiving a feedback message corresponding to the uplink signaling before switching between the first transmission configuration indicator mode and the second transmission configuration indicator mode, wherein the switching is based at least in part on the received feedback message and a timing threshold associated with the feedback message being satisfied.

Aspect 12: The method of any of aspects 8 through 11, further comprising: transmitting a message comprising capability information corresponding to a capability of the UE to support one or more of the first transmission configuration indicator mode or the second transmission configuration indicator mode.

Aspect 13: The method of any of aspects 8 through 12, wherein the uplink signaling comprises an indication of an uplink beam for the communicating.

Aspect 14: A method for wireless communications at a UE, comprising: identifying a transmission configuration indicator configuration having unconfigured power control parameters associated with a transmission configuration indicator mode, the transmission configuration indicator mode supporting at least one of a joint transmission configuration indicator state for an uplink transmission and a downlink reception and separate transmission configuration indicator states for the uplink transmission and the downlink reception; applying a rule to determine a common power control configuration based at least in part on the identifying, wherein the rule is applied to the transmission configuration indicator configuration to determine one or more power control parameters of the unconfigured power control parameters; and communicating based at least in part on the common power control configuration.

Aspect 15: The method of aspect 14, further comprising: determining one or more transmission configuration indicator states corresponding to a channel or a reference signal based at least in part on applying the common power control configuration to the one or more transmission configuration indicator states according to the rule.

Aspect 16: The method of aspect 15, wherein the rule specifies the common power control configuration comprises a single power control configuration.

Aspect 17: The method of any of aspects 15 through 16, further comprising: determining a single power control configuration corresponding to the common power control configuration; and applying the common power control configuration to a set of transmission configuration indicator states having the unconfigured power control parameters.

Aspect 18: The method of any of aspects 14 through 17, further comprising: transmitting a message comprising capability information corresponding to a capability of the UE to support the transmission configuration indicator mode.

Aspect 19: The method of any of aspects 14 through 18, further comprising: determining a capability of the UE to support beam misalignment.

Aspect 20: The method of aspect 19, further comprising: transmitting a message comprising capability information corresponding to the capability of the UE to support the beam misalignment.

Aspect 21: The method of any of aspects 19 through 20, further comprising: determining a quasi-colocation relationship between a downlink reference signal and at least one power control parameter of the one or more power control parameters based at least in part on the capability of the UE to support the beam misalignment, wherein the beam misalignment is between the downlink reference signal and the at least one power control parameter, and wherein the communicating is based at least in part on determining the quasi-colocation relationship.

Aspect 22: The method of any of aspects 14 through 21, further comprising: receiving signaling activating the transmission configuration indicator mode.

Aspect 23: The method of any of aspects 14 through 22, wherein the transmission configuration indicator configuration having the unconfigured power control parameters comprises a power control configuration that is not associated with a transmission configuration indicator state identifier.

Aspect 24: The method of any of aspects 14 through 23, wherein the one or more power control parameters comprise a base station received power per resource block, a fractional power control factor, closed loop index, a pathloss reference signal, or any combination thereof.

Aspect 25: A method for wireless communications at a base station, comprising: transmitting, to a UE signaling indicating for the UE to switch between a first transmission configuration indicator mode and a second transmission configuration indicator mode, wherein the first transmission configuration indicator mode supports a joint transmission configuration indicator state for an uplink transmission and a downlink reception, and wherein the second transmission configuration indicator mode supports separate transmission configuration indicator states for the uplink transmission and the downlink reception; identifying, based at least in part on a configuration for determining a transmission configuration indicator state to use after switching between the first transmission configuration indicator mode and the second transmission configuration indicator mode, the transmission configuration indicator state based at least in part on switching between the first transmission configuration indicator mode and the second transmission configuration indicator mode; and communicating with the UE using the transmission configuration indicator state based at least in part on the identifying.

Aspect 26: The method of aspect 25, wherein identifying the transmission configuration indicator state comprises: transmitting an indication of the transmission configuration indicator state in the signaling.

Aspect 27: The method of aspect 25, wherein identifying the transmission configuration indicator state comprises: identifying a rule corresponding to the transmission configuration indicator state, wherein the rule defines the transmission configuration indicator state based at least in part on an initial transmission configuration indicator state from before switching between the first transmission configuration indicator mode and the second transmission configuration indicator mode.

Aspect 28: The method of any of aspects 25 through 27, further comprising: determining to switch between the first transmission configuration indicator mode or the second transmission configuration indicator mode and a third transmission configuration indicator mode simultaneous to switching between the first transmission configuration indicator mode and the second transmission configuration indicator mode, wherein the third transmission configuration indicator mode supports at least one of the joint transmission configuration indicator state and the separate transmission configuration indicator states.

Aspect 29: The method of aspect 28, further comprising: receiving an indication of a downlink transmission configuration indicator state, an uplink transmission configuration indicator state, or both associated with the third transmission configuration indicator mode.

Aspect 30: The method of any of aspects 25 through 29, further comprising: transmitting a message comprising capability information corresponding to a capability of the UE to support one or more of the first transmission configuration indicator mode or the second transmission configuration indicator mode.

Aspect 31: The method of any of aspects 25 through 30, wherein the signaling comprises downlink control information, a medium access control-control element, or radio resource control signaling.

Aspect 32: A method for wireless communications at a base station, comprising: receiving, from a UE, uplink signaling based at least in part on a trigger event for switching between a first transmission configuration indicator mode and a second transmission configuration indicator mode, wherein the first transmission configuration indicator mode supports a joint transmission configuration indicator state for an uplink transmission and a downlink reception, and wherein the second transmission configuration indicator mode supports separate transmission configuration indicator states for the uplink transmission and the downlink reception; and switching between the first transmission configuration indicator mode and the second transmission configuration indicator mode for communicating based at least in part on receiving the uplink signaling.

Aspect 33: The method of aspect 32, wherein receiving the uplink signaling comprises: receiving a report based at least in part on determining a maximum permissible exposure is exceeded at the UE, detecting a beam failure, or both, wherein the trigger event comprises the determination.

Aspect 34: The method of any of aspects 32 through 33, further comprising: transmitting, to the UE, a feedback message corresponding to the uplink signaling, wherein the switching is performed based at least in part on a timing threshold associated with the uplink signaling being satisfied.

Aspect 35: The method of any of aspects 32 through 33, further comprising: transmitting, to the UE, a feedback message corresponding to the uplink signaling, wherein the switching is based at least in part on transmitting the feedback message and a timing threshold associated with the feedback message being satisfied.

Aspect 36: The method of any of aspects 32 through 35, further comprising: receiving a message comprising capability information corresponding to a capability of the UE to support one or more of the first transmission configuration indicator mode or the second transmission configuration indicator mode.

Aspect 37: The method of any of aspects 32 through 36, wherein the uplink signaling comprises an indication of an uplink beam for the communicating.

Aspect 38: An apparatus for wireless communications at a UE, comprising a processor; memory coupled with the processor; and instructions stored in the memory and executable by the processor to cause the apparatus to perform a method of any of aspects 1 through 7.

Aspect 39: An apparatus for wireless communications at a UE, comprising at least one means for performing a method of any of aspects 1 through 7.

Aspect 40: A non-transitory computer-readable medium storing code for wireless communications at a UE, the code comprising instructions executable by a processor to perform a method of any of aspects 1 through 7.

Aspect 41: An apparatus for wireless communications at a UE, comprising a processor; memory coupled with the processor; and instructions stored in the memory and executable by the processor to cause the apparatus to perform a method of any of aspects 8 through 13.

Aspect 42: An apparatus for wireless communications at a UE, comprising at least one means for performing a method of any of aspects 8 through 13.

Aspect 43: A non-transitory computer-readable medium storing code for wireless communications at a UE, the code comprising instructions executable by a processor to perform a method of any of aspects 8 through 13.

Aspect 44: An apparatus for wireless communications at a UE, comprising a processor; memory coupled with the processor; and instructions stored in the memory and executable by the processor to cause the apparatus to perform a method of any of aspects 14 through 24.

Aspect 45: An apparatus for wireless communications at a UE, comprising at least one means for performing a method of any of aspects 14 through 24.

Aspect 46: A non-transitory computer-readable medium storing code for wireless communications at a UE, the code comprising instructions executable by a processor to perform a method of any of aspects 14 through 24.

Aspect 47: An apparatus for wireless communications at a base station, comprising a processor; memory coupled with the processor; and instructions stored in the memory and executable by the processor to cause the apparatus to perform a method of any of aspects 25 through 31.

Aspect 48: An apparatus for wireless communications at a base station, comprising at least one means for performing a method of any of aspects 25 through 31.

Aspect 49: A non-transitory computer-readable medium storing code for wireless communications at a base station, the code comprising instructions executable by a processor to perform a method of any of aspects 25 through 31.

Aspect 50: An apparatus for wireless communications at a base station, comprising a processor; memory coupled with the processor; and instructions stored in the memory and executable by the processor to cause the apparatus to perform a method of any of aspects 32 through 37.

Aspect 51: An apparatus for wireless communications at a base station, comprising at least one means for performing a method of any of aspects 32 through 37.

Aspect 52: A non-transitory computer-readable medium storing code for wireless communications at a base station, the code comprising instructions executable by a processor to perform a method of any of aspects 32 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    identifying a transmission configuration indicator configuration having unconfigured power control parameters in a list of power control parameters and being associated with a transmission configuration indicator mode, the list of power control parameters including a single power control configuration, the transmission configuration indicator mode supporting at least one of a joint transmission configuration indicator state for an uplink transmission and a downlink reception and separate transmission configuration indicator states for the uplink transmission and the downlink reception;
    applying, prior to receiving an indication of an association between transmission configuration indicator configurations and power control parameters, a rule to determine a common power control configuration based at least in part on the identifying, wherein the rule is applied to the transmission configuration indicator configuration to determine one or more power control parameters of the unconfigured power control parameters; and
    communicating based at least in part on the common power control configuration.

2. The method of claim 1, wherein the single power control configuration is not associated with a transmission configuration indicator state identifier.

3. The method of claim 1, wherein the one or more power control parameters comprise a network entity received power per resource block, a fractional power control factor, closed loop index, a pathloss reference signal, or any combination thereof.

4. The method of claim 1, further comprising:
    determining one or more transmission configuration indicator states corresponding to a channel or a reference signal based at least in part on applying the common power control configuration to the one or more transmission configuration indicator states according to the rule.

5. The method of claim 4, wherein the rule specifies the common power control configuration comprises the single power control configuration.

6. The method of claim 4, further comprising:
    determining the single power control configuration corresponds to the common power control configuration; and
    applying the common power control configuration to a set of transmission configuration indicator states having the unconfigured power control parameters.

7. The method of claim 1, further comprising:
    determining a capability of the UE to support beam misalignment.

8. The method of claim 7, further comprising:
transmitting a message comprising capability information corresponding to the capability of the UE to support the beam misalignment.

9. The method of claim 7, further comprising:
determining a quasi-colocation relationship between a downlink reference signal and at least one power control parameter of the one or more power control parameters based at least in part on the capability of the UE to support the beam misalignment, wherein the beam misalignment is between the downlink reference signal and the at least one power control parameter, and wherein the communicating is based at least in part on determining the quasi-colocation relationship.

10. The method of claim 1, further comprising:
receiving signaling activating the transmission configuration indicator mode.

11. The method of claim 1, further comprising:
transmitting a message comprising capability information corresponding to a capability of the UE to support the transmission configuration indicator mode.

12. The method of claim 1, further comprising:
receiving the indication of the association between the transmission configuration indicator configurations and the power control parameters; and
updating the list of power control parameters based at least in part on the association.

13. A user equipment (UE), comprising:
one or more memories storing processor-executable code; and
one or more processors coupled with the one or more memories and individually or collectively operable to execute the code to cause the UE to:
identify a transmission configuration indicator configuration having unconfigured power control parameters in a list of power control parameters and being associated with a transmission configuration indicator mode, the list of power control parameters including a single power control configuration, the transmission configuration indicator mode supporting at least one of a joint transmission configuration indicator state for an uplink transmission and a downlink reception and separate transmission configuration indicator states for the uplink transmission and the downlink reception;
apply, prior to receiving an indication of an association between transmission configuration indicator configurations and power control parameters, a rule to determine a common power control configuration based at least in part on the identifying, wherein the rule is applied to the transmission configuration indicator configuration to determine one or more power control parameters of the unconfigured power control parameters; and
communicate based at least in part on the common power control configuration.

14. The UE of claim 13, wherein the single power control configuration is not associated with a transmission configuration indicator state identifier.

15. The UE of claim 13, wherein the one or more power control parameters comprise a network entity received power per resource block, a fractional power control factor, closed loop index, a pathloss reference signal, or any combination thereof.

16. The UE of claim 13, wherein the one or more processors are individually or collectively further operable to execute the code to cause the UE to:
determine one or more transmission configuration indicator states corresponding to a channel or a reference signal based at least in part on applying the common power control configuration to the one or more transmission configuration indicator states according to the rule.

17. The UE of claim 16, wherein the rule specifies the common power control configuration comprises the single power control configuration.

18. The UE of claim 16, wherein the one or more processors are individually or collectively further operable to execute the code to cause the UE to:
determine the single power control configuration corresponds to the common power control configuration; and
apply the common power control configuration to a set of transmission configuration indicator states having the unconfigured power control parameters.

19. The UE of claim 13, wherein the one or more processors are individually or collectively further operable to execute the code to cause the UE to:
determine a capability of the UE to support beam misalignment.

20. The UE of claim 19, wherein the one or more processors are individually or collectively further operable to execute the code to cause the UE to:
transmit a message comprising capability information corresponding to the capability of the UE to support the beam misalignment.

21. The UE of claim 19, wherein the one or more processors are individually or collectively further operable to execute the code to cause the UE to:
determine a quasi-colocation relationship between a downlink reference signal and at least one power control parameter of the one or more power control parameters based at least in part on the capability of the UE to support the beam misalignment, wherein the beam misalignment is between the downlink reference signal and the at least one power control parameter, and wherein the communicating is based at least in part on determining the quasi-colocation relationship.

22. The UE of claim 13, wherein the one or more processors are individually or collectively further operable to execute the code to cause the UE to:
receive signaling activating the transmission configuration indicator mode.

23. The UE of claim 13, wherein the one or more processors are individually or collectively further operable to execute the code to cause the UE to:
transmit a message comprising capability information corresponding to a capability of the UE to support the transmission configuration indicator mode.

24. A non-transitory computer-readable medium storing code for wireless communications, the code comprising instructions executable by one or more processors to:
identify a transmission configuration indicator configuration having unconfigured power control parameters in a list of power control parameters and being associated with a transmission configuration indicator mode, the list of power control parameters including a single power control configuration, the transmission configuration indicator mode supporting at least one of a joint transmission configuration indicator state for an uplink transmission and a downlink reception and separate transmission configuration indicator states for the uplink transmission and the downlink reception;

apply, prior to receiving an indication of an association between transmission configuration indicator configurations and power control parameters, a rule to determine determining a common power control configuration based at least in part on the identifying, wherein the rule is applied to the transmission configuration indicator configuration to determine one or more power control parameters of the unconfigured power control parameters; and communicate based at least in part on the common power control configuration.

25. The non-transitory computer-readable medium of claim 24, wherein the single power control configuration is not associated with a transmission configuration indicator state identifier.

26. The non-transitory computer-readable medium of claim 24, wherein the one or more power control parameters comprise a network entity received power per resource block, a fractional power control factor, closed loop index, a pathloss reference signal, or any combination thereof.

27. The non-transitory computer-readable medium of claim 24, wherein the instructions are further executable by the one or more processors to:

determine one or more transmission configuration indicator states corresponding to a channel or a reference signal based at least in part on applying the common power control configuration to the one or more transmission configuration indicator states according to the rule.

28. The non-transitory computer-readable medium of claim 27, wherein the rule specifies the common power control configuration comprises the single power control configuration.

29. The non-transitory computer-readable medium of claim 27, wherein the instructions are further executable by the one or more processors to:

determine the single power control configuration corresponds to the common power control configuration; and apply the common power control configuration to a set of transmission configuration indicator states having the unconfigured power control parameters.

30. A user equipment (UE) for wireless communications, comprising:

processing circuitry associated with one or more memory devices and configured to cause the UE to:

identify a transmission configuration indicator configuration having unconfigured power control parameters in a list of power control parameters and being associated with a transmission configuration indicator mode, the list of power control parameters including a single power control configuration, the transmission configuration indicator mode supporting at least one of a joint transmission configuration indicator state for an uplink transmission and a downlink reception and separate transmission configuration indicator states for the uplink transmission and the downlink reception;

apply, prior to receiving an indication of an association between transmission configuration indicator configurations and power control parameters, a rule to determine a common power control configuration based at least in part on the identifying, wherein the rule is applied to the transmission configuration indicator configuration to determine one or more power control parameters of the unconfigured power control parameters; and communicate based at least in part on the common power control configuration.

* * * * *